US012785291B2

(12) United States Patent
Cameron et al.

(10) Patent No.: US 12,785,291 B2
(45) Date of Patent: Nov. 3, 2026

(54) SIGNAL CONDITIONING MODULES IN PHASED ARRAY ANTENNAS

(71) Applicant: Space Exploration Technologies Corp., Hawthorne, CA (US)

(72) Inventors: Trevor Cameron, Redmond, WA (US); Javier Rodriguez De Luis, Kirkland, WA (US); Nil Apaydin, Kirkland, WA (US)

(73) Assignee: Space Exploration Technologies Corp., Starbase, TX (US)

( * ) Notice: Subject to any disclaimer, the term of this patent is extended or adjusted under 35 U.S.C. 154(b) by 104 days.

(21) Appl. No.: 18/922,986

(22) Filed: Oct. 22, 2024

(65) Prior Publication Data

US 2025/0047011 A1 Feb. 6, 2025

Related U.S. Application Data

(63) Continuation of application No. 17/993,606, filed on Nov. 23, 2022, now Pat. No. 12,148,998.
(Continued)

(51) Int. Cl.
*H01Q 21/08* (2006.01)
*H01Q 1/38* (2006.01)
(Continued)

(52) U.S. Cl.
CPC ............... *H01Q 21/08* (2013.01); *H01Q 1/38* (2013.01); *H01Q 1/526* (2013.01); *H04B 1/1607* (2013.01); *H04B 1/1638* (2013.01)

(58) Field of Classification Search
CPC ...... H01Q 21/06; H01Q 21/061; H01Q 21/08; H01Q 3/26; H01Q 3/2658; H01Q 3/30;
(Continued)

(56) References Cited

U.S. PATENT DOCUMENTS 9,059,490 B2 * 6/2015 DeVries .................... H01P 3/08
9,257,754 B2 * 2/2016 Carpentier ......... H01Q 21/0087
(Continued)

OTHER PUBLICATIONS

Extended EP Search Report, dated May 17, 2023, for EP patent application No. EP 22209006.0 (9 pages).
(Continued)

*Primary Examiner* — Jason M Crawford
(74) *Attorney, Agent, or Firm* — Polsinelli PC

(57) ABSTRACT

A phased array antenna system includes a carrier, a first antenna element and a second antenna element coupled to a first side of the carrier, the second antenna element spaced apart from the first antenna element by a space; and a signal conditioning module including a support structure having a first side and a second side opposite the first side, one or more signal conditioning elements coupled to the first side of the support structure, and a plurality of coupling elements coupled to the second side of the support structure. The signal conditioning module is coupled to the first side of the carrier and disposed in the space on the first side of the carrier between the first antenna element and the second antenna element. At least one coupling element is electrically coupled to the carrier. The signal conditioning module is electrically coupled to the first antenna element.

21 Claims, 21 Drawing Sheets

Related U.S. Application Data

(60) Provisional application No. 63/283,125, filed on Nov. 24, 2021.

(51) Int. Cl.
*H01Q 1/52* (2006.01)
*H04B 1/16* (2006.01)

(58) Field of Classification Search
CPC .......... H01Q 3/40; H01Q 1/22; H01Q 1/2283; H01Q 1/52; H01Q 1/521; H01Q 1/523; H01Q 1/526
See application file for complete search history.

(56) References Cited

U.S. PATENT DOCUMENTS

| | | | | |
|---|---|---|---|---|
| 12,148,998 | B2 * | 11/2024 | Cameron | H04B 1/1607 |
| 2015/0015453 | A1 * | 1/2015 | Puzella | H01Q 21/0025 333/1.1 |
| 2019/0013580 | A1 * | 1/2019 | Vigano | H01Q 3/2658 |
| 2019/0252775 | A1 * | 8/2019 | Mahanfar | H05K 1/144 |
| 2019/0252796 | A1 * | 8/2019 | Mahanfar | H01Q 1/523 |
| 2020/0036095 | A1 * | 1/2020 | Elsherbini | H01Q 21/0087 |
| 2021/0391903 | A1 * | 12/2021 | Jam | H04B 7/06952 |
| 2022/0006185 | A1 * | 1/2022 | Yetisir | H01Q 9/045 |
| 2023/0163485 | A1 * | 5/2023 | Cameron | H01Q 1/38 343/702 |
| 2024/0030597 | A1 * | 1/2024 | Schulze | H04B 7/086 |
| 2024/0080967 | A1 * | 3/2024 | Karol | H01Q 21/06 |
| 2024/0154652 | A1 * | 5/2024 | McCormick | H04B 7/043 |
| 2025/0047011 | A1 * | 2/2025 | Cameron | H01Q 1/38 |

OTHER PUBLICATIONS

Watanabe et al., "A review of 5G front-end systems package integration", IEEE Transactions on Components, Packaging and Manufacturing Technology 11, No. 1 (2020): 118-133.

Gu et al., "Packaging and antenna integration for silicon-based millimeter-wave phased arrays: 5G and beyond", IEEE Journal of Microwaves 1, No. 1 (2021): 123-134.

Gültepe et al., "A 256-element dual-beam polarization-agile SATCOM Ku-band phased-array with 5-dB/KG/T", IEEE Transactions on Microwave Theory and Techniques 69, No. 11 (2021): 4986-4994.

Park et al., "Millimeter-wave phased-array antenna-in-package (AiP) using stamped metal process for enhanced heat dissipation", IEEE Antennas and Wireless Propagation Letters 18, No. 11 (2019): 2355-2359.

* cited by examiner

SIGNAL CONDITIONING MODULES IN PHASED ARRAY ANTENNAS

CROSS-REFERENCE TO RELATED APPLICATION

This application is a continuation of U.S. patent application Ser. No. 17/993,606, filed Nov. 23, 2022, entitled SIGNAL CONDITIONING MODULES IN PHASED ARRAY ANTENNAS, which claims priority and the benefit of U.S. Provisional Application No. 63/283, 125, filed Nov. 24, 2021, entitled SIGNAL CONDITIONING MODULES IN PHASED ARRAY ANTENNAS, the disclosure of which is expressly incorporated by reference herein in its entirety.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna can be formed from a set of antenna elements to simulate a large directional antenna. An advantage of a phased array antenna is its ability to transmit and/or receive signals in a preferred direction (e.g., the antenna's beamforming ability) without physical repositioning or reorientating.

It would be advantageous to configure phased array antennas having increased bandwidth while maintaining a high ratio of the main lobe power to the side lobe power. Likewise, it would be advantageous to configure phased array antennas and associated circuitry having reduced weight, reduced size, lower manufacturing cost, and/or lower power requirements. Accordingly, embodiments of the present disclosure are directed to these and other improvements in phased array antenna systems or portions thereof.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a phased array antenna system is provided. The phased array antenna system includes: a carrier having a first side and a second side opposite the first side; a first antenna element and a second antenna element coupled to the first side of the carrier, the second antenna element spaced apart from the first antenna element by a space; and a signal conditioning module including a support structure having a first side and a second side opposite the first side, one or more signal conditioning elements coupled to the first side of the support structure, and a plurality of coupling elements coupled to the second side of the support structure, wherein: at least one of the plurality of coupling elements electrically couples the signal conditioning module to the first antenna element; and at least another of the plurality of coupling elements electrically couples the signal conditioning module to the carrier.

In accordance with another embodiment of the present disclosure, a signal conditioning system is provided. The signal conditioning system includes: a support structure having a first side and a second side opposite the first side; one or more signal conditioning elements coupled to the first side of the support structure; and a plurality of coupling elements coupled to the second side of the support structure.

In accordance with another embodiment of the present disclosure, a phased array antenna system is provided. The phased array antenna system includes: a carrier having a first side and a second side opposite the first side; a first antenna element and a second antenna element coupled to the first side of the carrier, the second antenna element spaced apart from the first antenna element by a space; and a signal conditioning module including a support structure having a first side and a second side opposite the first side, one or more signal conditioning elements coupled to the first side of the support structure, and a plurality of coupling elements coupled to the second side of the support structure, wherein: the signal conditioning module is coupled to the first side of the carrier and disposed in the space on the first side of the carrier between the first antenna element and the second antenna element; at least one of the plurality of coupling elements is electrically coupled to the carrier; the signal conditioning module is electrically coupled to the first antenna element via the carrier; and the support structure is spaced from the carrier by the plurality of coupling elements.

In any of the embodiments described herein, the support structure may include a ground plane.

In any of the embodiments described herein, the ground plane may be disposed between the one or more signal conditioning elements and the plurality of coupling elements.

In any of the embodiments described herein, the plurality of coupling elements may include a plurality of solder balls and the ground plane provides at least partial electromagnetic isolation between the one or more signal conditioning elements and the carrier.

In any of the embodiments described herein, the one or more signal conditioning elements include first and second filter elements coupled to the support structure.

In any of the embodiments described herein, the first and second filter elements are configured to attenuate signals within one or more radio astronomy (RA) frequency bands.

In any of the embodiments described herein, the one or more signal conditioning elements are at least partially covered by one or more layers of an isolation material.

In any of the embodiments described herein, a shielding layer may be disposed on at least a portion of the isolation material.

In any of the embodiments described herein, the shielding layer may be conductive and electrically coupled to a ground conductor of the signal conditioning module included in the support structure.

In any of the embodiments described herein, the shielding layer and the support structure may form a continuous enclosure around the one or more signal conditioning elements.

In any of the embodiments described herein, the shielding layer may include a faraday cage.

In any of the embodiments described herein, the shielding layer may include a floating metallic layer disposed on one or more surfaces of the isolation material.

In any of the embodiments described herein, a first antenna module coupled to the first side of the carrier includes the first antenna element and a second antenna module coupled to the first side of the carrier includes the second antenna element.

In any of the embodiments described herein, the one or more signal conditioning elements comprise an amplifier.

In any of the embodiments described herein, the amplifier may be electrically coupled to the first antenna element.

In any of the embodiments described herein, the amplifier may include a power amplifier (PA) configured to operate in at least a transmit configuration; and the amplifier may be configured to transmit a transmit signal to the first antenna element in the transmit configuration.

In any of the embodiments described herein, the amplifier may be further configured to operate in a calibration receive configuration and receive a calibration signal from at least one of the first antenna element, the second antenna element, and another antenna element of the phased array antenna system.

In any of the embodiments described herein, configuring the PA in the transmit configuration may include configuring a selection switch in a first position, wherein the selection switch may be disposed between the first antenna element and the PA.

In any of the embodiments described herein, configuring the PA in the calibration receive configuration may include configuring the selection switch in a second position.

In any of the embodiments described herein, a pre-amplifier filter may be electrically coupled between an input of the signal conditioning module and an input of the PA.

In any of the embodiments described herein, the pre-amplifier filter may be configured to attenuate signals in one or more RA frequency bands.

In any of the embodiments described herein, a post-amplifier filter may be electrically coupled between an output of the PA and an output of the signal conditioning module.

In any of the embodiments described herein, the post-amplifier filter may be configured to attenuate signals in one or more RA frequency bands.

In any of the embodiments described herein, the amplifier may include a low-noise amplifier (LNA) configured to operate in a receive configuration; and the LNA may be configured to receive a receive signal from the first antenna element in the receive configuration.

In any of the embodiments described herein, the LNA may be further configured to operate in a calibration transmit configuration and transmit signals to at least one of the first antenna element, the second antenna element, or another antenna element of the phased array antenna system.

In any of the embodiments described herein, configuring the LNA in the receive configuration may include configuring a selection switch in a first position, wherein the selection switch may be disposed between the first antenna element and the LNA.

In any of the embodiments described herein, configuring the LNA in the calibration transmit configuration may include configuring the selection switch in a second position.

In any of the embodiments described herein, the signal conditioning module may be coupled to the carrier and disposed in the space on the first side of the carrier between the first antenna element and the second antenna element and the support structure may be spaced from the carrier by the plurality of coupling elements.

In any of the embodiments described herein, the first antenna element may be included in an antenna module, the signal conditioning module may be disposed within a cavity of the antenna module between the antenna module and the carrier, and the support structure may be spaced from the first antenna element by the plurality of coupling elements.

In any of the embodiments described herein, the first antenna element may be included in an antenna module, the signal conditioning module may be disposed within a cavity of the antenna module between the antenna module and the carrier, and the support structure may be spaced from the carrier by the plurality of coupling elements.

In any of the embodiments described herein, the support structure may include a ground layer disposed at least partially between the one or more signal conditioning elements and the plurality of coupling elements.

In any of the embodiments described herein, the one or more signal conditioning elements may include an amplifier.

In any of the embodiments described herein, the one or more signal conditioning elements may include one or more RF filters.

In any of the embodiments described herein, the support structure may include a ground plane.

In any of the embodiments described herein, the ground plane may be at least partially disposed between the one or more signal conditioning elements and the plurality of coupling elements.

In any of the embodiments described herein, the plurality of coupling elements may include one or more solder balls and the ground plane provides at least partial electromagnetic isolation between the one or more signal conditioning elements and a component of a phased array antenna coupled to the plurality of coupling elements.

In any of the embodiments described herein, the component of the phased array antenna coupled to the plurality of coupling elements includes a carrier of the phased array antenna.

In any of the embodiments described herein, the component of the phased array antenna coupled to the plurality of coupling elements includes an antenna module of the phased array antenna.

In any of the embodiments described herein, the signal conditioning system may be disposed in a cavity between the antenna module and a carrier of the phased array antenna.

In any of the embodiments described herein, the one or more signal conditioning elements include first and second filter elements coupled to the support structure.

In any of the embodiments described herein, the first and second filter elements are configured to attenuate signals within one or more radio astronomy (RA) frequency bands.

In any of the embodiments described herein, the one or more signal conditioning elements are at least partially covered by one or more layers of an isolation material.

In any of the embodiments described herein, a shielding layer may be disposed on at least a portion of the isolation material.

In any of the embodiments described herein, the shielding layer may be conductive and electrically coupled to a ground conductor of the signal conditioning system included in the support structure.

In any of the embodiments described herein, the shielding layer and the support structure form a continuous enclosure around the one or more signal conditioning elements.

In any of the embodiments described herein, the shielding layer may include a faraday cage.

In any of the embodiments described herein, the shielding layer may include a floating metallic layer disposed on one or more surfaces of the isolation material.

In any of the embodiments described herein, the support structure may include a ground plane.

In any of the embodiments described herein, the ground plane may be disposed between the one or more signal conditioning elements and the plurality of coupling elements.

In any of the embodiments described herein, the plurality of coupling elements may include a plurality of solder balls and the ground plane provides at least partial electromagnetic isolation between the one or more signal conditioning elements and the carrier.

In any of the embodiments described herein, the one or more signal conditioning elements include first and second filter elements coupled to the support structure.

In any of the embodiments described herein, the first and second filter elements are configured to attenuate signals within one or more radio astronomy (RA) frequency bands.

In any of the embodiments described herein, the one or more signal conditioning elements are at least partially covered by one or more layers of an isolation material.

In any of the embodiments described herein, a shielding layer may be disposed on at least a portion of the isolation material.

In any of the embodiments described herein, the shielding layer may be conductive and electrically coupled to a ground conductor of the signal conditioning module included in the support structure.

In any of the embodiments described herein, the shielding layer and the support structure form a continuous enclosure around the one or more signal conditioning elements.

In any of the embodiments described herein, the one or more signal conditioning elements comprise an amplifier.

In any of the embodiments described herein, a first antenna module coupled to the first side of the carrier includes the first antenna element and a second antenna module coupled to the first side of the carrier includes the second antenna element.

In any of the embodiments described herein, the amplifier may be electrically coupled to the first antenna element.

In any of the embodiments described herein, the amplifier may include a power amplifier (PA) configured to operate in at least a transmit configuration; and the amplifier may be configured to transmit a transmit signal to the first antenna element in the transmit configuration.

In any of the embodiments described herein, the amplifier may be further configured to operate in a calibration receive configuration and receive a calibration signal from at least one of the first antenna element, the second antenna element, and another antenna element of the phased array antenna system.

In any of the embodiments described herein, a pre-amplifier filter may be electrically coupled between an input of the signal conditioning module and an input of the PA.

In any of the embodiments described herein, the pre-amplifier filter may be configured to attenuate signals in one or more RA frequency bands.

In any of the embodiments described herein, a post-amplifier filter may be electrically coupled between an output of the PA and an output of the signal conditioning module.

In any of the embodiments described herein, the post-amplifier filter may be configured to attenuate signals in one or more RA frequency bands.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1A:
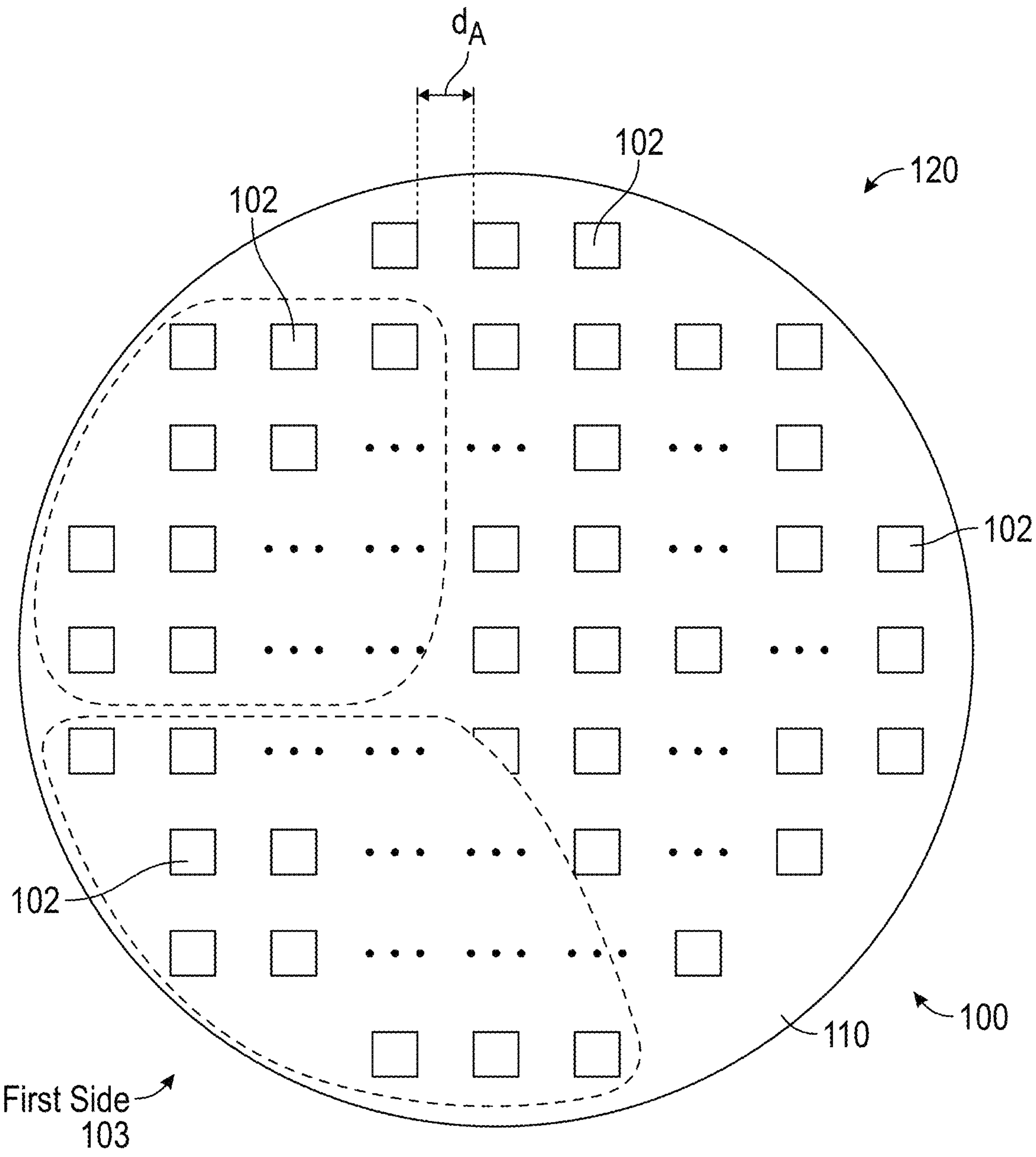
FIG. 1A is an example illustration of a top view of an antenna lattice according to some embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a cathode ray tube (CRT) display or liquid crystal display (LCD).

Embodiments of the present disclosure are directed to antenna apparatuses including antenna systems designed for sending and/or receiving radio frequency signals.

FIG. 1A is an example illustration of a top view of an antenna lattice 100. Antenna lattice 100 of the illustrated embodiment is part of a phased array antenna (e.g., phased array antenna 120 shown in FIG. 1B). The antenna lattice 100 includes a plurality of antenna elements 102 arranged in a particular pattern. The antenna elements 102 in the antenna lattice 100 may be coupled to a first side 103 of carrier 110, such as a printed circuit board (PCB) and electrically coupled to additional components disposed on a second side of the carrier, opposite the first side of the carrier, such as additional components 108 shown in FIG. 1B. The additional components can include, without limitation, digital beamformer (DBF) chips, phase shifters, modulators, demodulators, electrical coupling structures, RF filters, or the like.

The spacing of the antenna elements 102 in the antenna lattice 100 may be determined by an operational frequency of the phased array antenna, such as a transmit frequency for a transmitting phased array antenna or a receive frequency for a receiving phased array antenna. The maximum spacing between adjacent antenna elements of the antenna elements 102 may be determined based on the maximum steering angle $\theta_{max}$ for which the antenna lattice 100 is configured to transmit and/or receive radio frequency (RF) signals. The maximum spacing $d_{max}$ between adjacent antenna elements 102 as a function of maximum steering angle $\theta_{max}$ and transmit or receive signal wavelength $\lambda$ may be determined based on Equation (1) below:

$$d_{max} = \frac{\lambda}{1 + \sin(\theta_{max})} \tag{1}$$

As may be seen from Equation (1), as the maximum steering angle $\theta_{max}$ increases from the broadside angle of 0 degrees up to an end fire angle of 90 degrees, the corresponding maximum antenna element spacing $d_{max}$ decreases. In the case of an antenna lattice with a designed maximum steering angle $\theta_{max}$ and corresponding antenna element spacing $d_{max}$, any steering angles in excess of $\theta_{max}$ can result in grating lobes. Grating lobes are a special case of antenna side lobes where the signal power (in the case of a transmitting phased array) or the signal sensitivity (in the case of a receiving phased array antenna) of the side lobe is approximately equal to the signal power or signal sensitivity of the main lobe of the phased array antenna. If the phased array antenna is operated at a steering angle exceeding $\theta_{max}$ the main lobe will be directed in the direction of $\theta_{max}$, while one or more grating lobes will be directed at angles oblique to $\theta_{max}$. Grating lobes can result in the loss of a portion of transmitted power from the main lobe of the phased array antenna in the case of a transmitting phased array antenna. In a receiving phased array antenna, grating lobes may result in pickup of interfering signals coming from the directions of the grating lobes.

Equation (1) indicates that it is desirable to space the antenna elements 102 close together (e.g., with a spacing less than $d_{max}$ ) to avoid the emergence of grating lobes. Placing antenna elements 102 close together can also increase the total number of antenna elements in the array, which can in turn improve the gain and/or sensitivity of the phased array antenna 120. However, there are also advantages to increasing the spacing between adjacent antenna elements 102 in the antenna lattice 100. For example, maximizing the distance between antenna elements 102 in a uniformly spaced antenna lattice 100 as shown in FIG. 1A can reduce the total number of antenna elements in the antenna lattice. Reducing the total number of antenna elements 102 in the antenna lattice 100 can reduce the cost and weight of the phased array antenna 120.

In one illustrative example, the antenna elements 102 may be separated by a distance $d_A$ slightly smaller than $d_{max}$ for a selected maximum steering angle $\theta_{max}$ to avoid grating lobes at steering angles near $\theta_{max}$ that can result from manufacturing variances. The spacing $d_A$ between antenna elements 102 can impose constraints on the location of various components of the phased array antenna such as the antenna elements 102, and other circuitry (e.g., amplifiers, filters, beamformers, radio frequency (RF) circuitry, or the like).

Figure 1B:
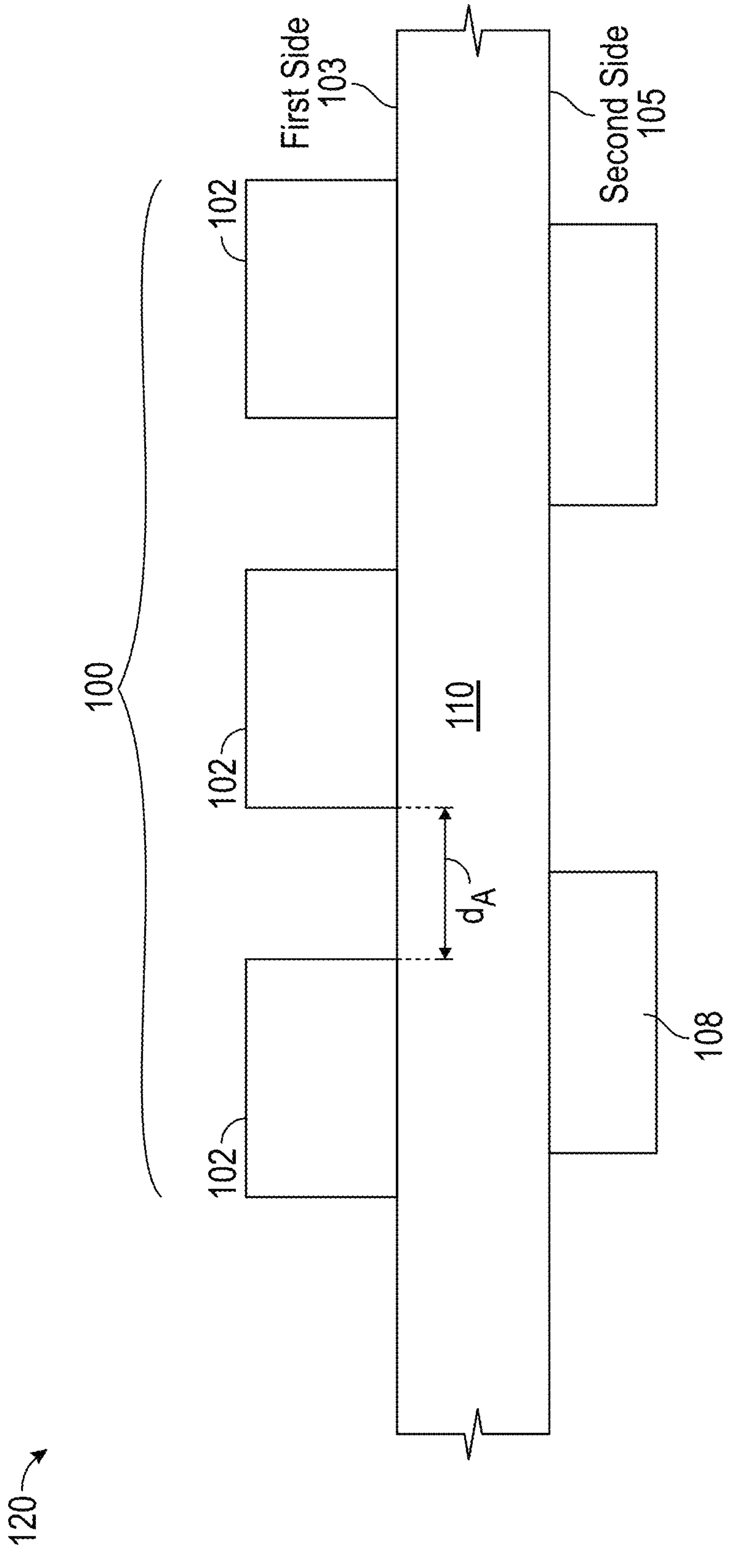
FIG. 1B depicts a block diagram of a cross-sectional side view of a phased array antenna according to some embodiments of the present disclosure.

FIG. 1B depicts a cross-sectional side view of a portion of a phased array antenna 120 including antenna elements 102 included in an antenna lattice 100, a carrier 110, and one or more additional components 108. The antenna elements 102 are depicted as being disposed at a first side 103 of the carrier 110 and protruding from the first side 103 of the carrier 110. In the illustration of FIG. 1B, the antenna elements may be included in antenna modules or antenna-in-package (AIP) modules as will be described in more detail below. In addition, in some cases, the antenna elements 102 may be fabricated directly within layers of the carrier 110 (e.g., the PCB) as will be also be described below. In such cases, the antenna elements 102 may not necessarily protrude from the surface of the carrier 110 as depicted in FIG. 1B. FIG. 1B also illustrates additional components 108 of the phased array antenna 120 disposed on a second side 105 of the carrier 110 opposite the first side 103 of the carrier. The additional components 108 can include, without limitation, beamformers, RF filters, modulators/demodulators, oscillators, or the like. In some embodiments, one or more of the additional components 108 can also be disposed on the first side 103 of the carrier 110 and/or embedded within internal layers of the carrier 110.

Antenna Modules Fabricated Within PCB Layers

An example approach to fabricating a phased array antenna 120 (e.g., including an antenna lattice 100) is to fabricate a plurality of antenna elements included in the phased array antenna 120 within the layers of a PCB (e.g., carrier 110). This approach may be referred to as an integrated phased array or integrated antenna array. The antenna elements (e.g., antenna elements 102 shown in FIG. 1A or FIG. 1B) may include a dipole antenna, a patch antenna, a slot antenna, a micro-strip antenna, a uni-directional antenna, or the like. In an integrated phased array, the antenna elements may be formed of a board layer with associated components/circuitry of the phased array antenna 120 fabricated within the board layer and/or the PCB. In some embodiments the PCB can include additional layers so that radiated energy emitted from the antenna elements and/or radiated energy received by the antenna elements is not attenuated by layers of circuitry covering the antenna elements. In some cases, additional PCB layers are placed between the antenna elements and other components/circuitry within the PCB to satisfy antenna radiative requirements (e.g., certain distance between antenna radiative element and ground plane). The board layer or additional layers may be a special layer that is more expensive than other layers comprising the PCB. The height/thickness of such layer(s) may be (significantly) greater than that of the other layers comprising the PCB, contributing to overall weight and size of the PCB.

Each of the antenna elements 102 may be coupled to one or more amplifiers. For antenna elements 102 in a receiving phased array antenna, the amplifier may be a low-noise amplifier (LNA) and for antenna elements in a transmitting phased array antenna, the amplifier may be a power amplifier (PA). For antenna elements 102 in a transceiving phased array antenna, each antenna element can be coupled to both an LNA and a PA. In order to reduce coupling between the amplifier and the antenna element (as discussed in more detail below with respect to FIG. 3A and FIG. 3B), the antenna element may be spaced a certain distance from the amplifier or shielded from the amplifier. In some cases, the antenna element can be fabricated on one side of the PCB and the amplifier can be placed on the opposite side of the PCB. Depending on the number of routing layers included within the PCB for supporting connections between antenna elements and amplifiers, amplifiers and beamformers, and other component connections, the trace lengths between antenna elements and amplifiers may become long and/or can have unequal lengths. Long traces can result in signal loss (or attenuation) and unequal trace lengths can produce unwanted phase shifts that can affect the beam pattern of the phased array antenna.

Integrated Antenna Modules

In some embodiments, each antenna element, associated amplifier, and associated circuitry included in the phased array antenna 120 may be configured together as an antenna in package (AIP) module. FIG. 2A through FIG. 2E illustrate example AIP module configurations. A plurality of such AIP modules may be located in a particular arrangement (e.g., antenna lattice 100 of FIG. 1A) on a carrier 110, for example, a substrate, board, PCB, baseboard, panel, layer, or the like to define a particular antenna aperture.

Figure 2A:
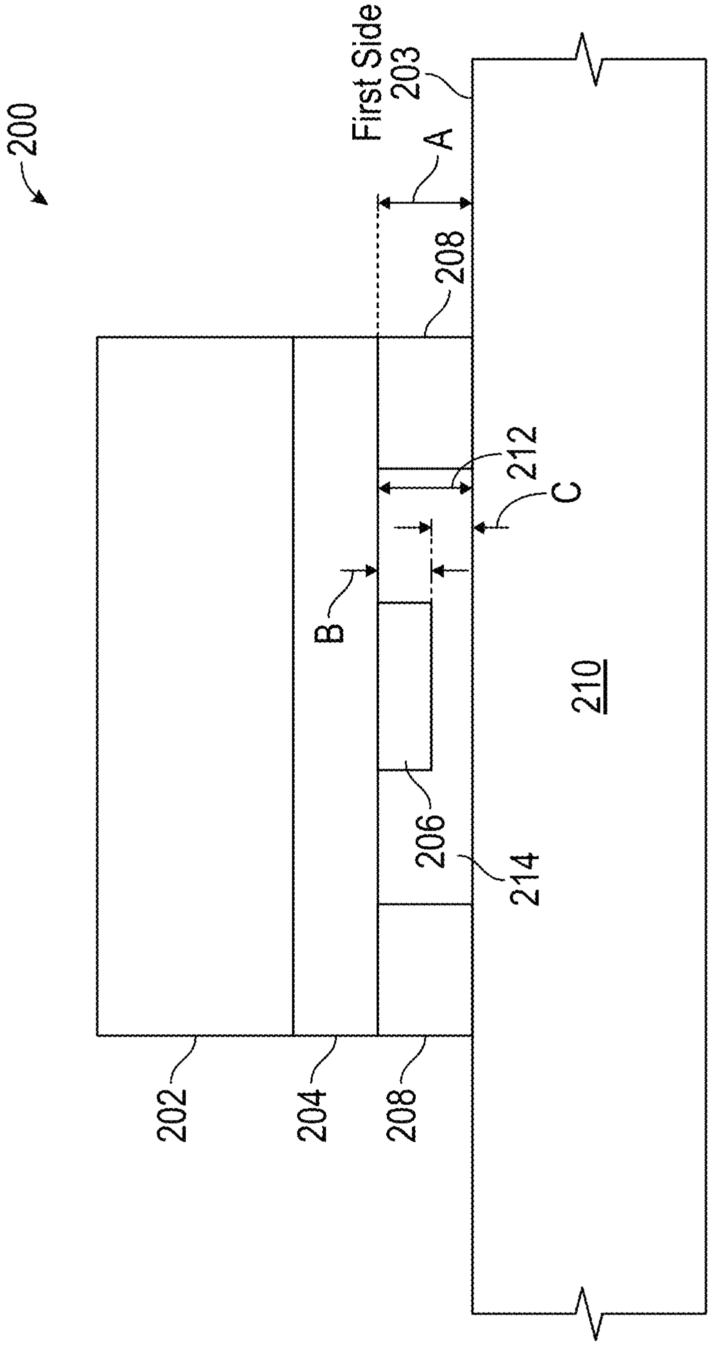
FIG. 2A depicts a block diagram of a cross-sectional side view of an example antenna in package (AIP) module according to previously developed technology.

Referring to FIG. 2A, a spacer structure 208 can provide a spacing 212 between the antenna element 202, associated amplifier 206, and/or associated circuitry 204, and the carrier 210. In some cases, at least a portion of the antenna may be disposed on a first side 203 (shown as a top side in the illustrated embodiment of FIG. 2A) of the AIP module 200. The spacing 212 can create a cavity 214 between the circuitry 204 and the carrier 210.

FIG. 2A depicts a block diagram of a cross-sectional side view of an example AIP module 200 in accordance with some embodiments of the present disclosure. AIP module 200 may include, without limitation, an antenna element 202, circuitry 204, amplifier 206, and a spacer structure 208. Circuitry 204 may be disposed between the antenna element 202 and spacer structure 208. Amplifier 206 may be disposed at a side of the circuitry 204 furthest from the antenna element 202. Antenna element 202, circuitry 204, amplifier 206, and spacer structure 208 may be physically and/or electrically coupled to each other.

Antenna element 202 may comprise a dipole antenna, a patch antenna, a slot antenna, a micro-strip antenna, a uni-directional antenna, or the like. Circuitry 204 may comprise one or more layers including one or more electronic components, RF circuitry, electronic circuitry, passive electrical elements (e.g., inductors, capacitors, resistors, ferrite beads, etc.), electrical conductive traces, and/or the like configured to facilitate signal propagation between and among antenna element 202, amplifier 206, and/or carrier 210 without undue signal degradation or distortion. For example, circuitry 204 may be configured to provide impedance matching. Circuitry 204 may also be referred to as RF circuitry, antenna associated circuitry, passive circuitry, or the like. In some cases, additional layers may be placed between the antenna element 202 and the circuitry 204 and/or amplifier 206 to satisfy antenna radiative requirements (e.g., certain distance between antenna radiative element and ground plane), contributing to overall weight and size of the AIP module 200.

Amplifier 206 may comprise a power amplifier (PA) when AIP module 200 is implemented in a transmitter panel or an LNA when AIP module 200 is implemented in a receiver panel. Amplifier 206 may comprise an application specific integrated circuit (ASIC) which may be packaged as an integrated circuit (IC) chip. Amplifier 206 may comprise the active circuitry or components within the AIP module 200. Although circuitry 204 and amplifier 206 are depicted as separate elements in FIG. 2A, in some embodiments, circuitry 204 and amplifier 206 may be implemented as a unitary element, circuit, or component. The amplifier 206 is illustrated with a height B.

Spacer structure 208 may be configured to provide a certain amount of spacing (shown as vertical spacing in the illustrated embodiment) between a the circuitry 204 of the AIP module 200 and the first side 203 of the carrier 210, the spacing sufficient for housing the amplifier 206: (1) to be located on between the circuitry 204 and the first side 203 of the carrier 210, (2) without contacting the carrier 210, and (3) to avoid being damaged when AIP module 200 is attached to the carrier 210. Spacer structure 208, also referred to as a support structure, spacer, frame, picture frame, solder balls and/or the like, serves to create a cavity 214 for locating the amplifier 206 proximate to or as close as possible to the antenna element 202 to minimize signal propagation distance between the antenna element 202 and amplifier 206 (e.g., to reduce RF transition loss or attenuation). The spacer structure 208 may comprise a structure coupled to the carrier 210 by coupling elements. In one illustrative example, the coupling elements can comprise solder balls that couple the spacer structure 208 to the carrier. In other embodiments, the spacer structure 208 may be formed from solder balls and/or pillars. The height A of the spacer structure 208 may determine a spacing A between the circuitry 204 and the carrier 210. Similarly, the height B of the amplifier 206 and the height A of the spacer structure 208 can determine a spacing C between the amplifier 206 and the carrier 210.

AIP module 200 and, in particular, spacer structure 208, may physically and electrically couple to a first side 203 of the carrier 210. Carrier 210, also referred to as a baseboard, board, substrate, carrier, panel, layer, stack, PCB, or the like, may correspond to, for example, carrier 110 illustrated in FIG. 1A and FIG. 1B. In some embodiments, carrier 210 may comprise a transmitter panel, a receiver panel, or a portion thereof. When viewed from the top, carrier 210 may be round in shape. Alternatively, carrier 210 may have a square shape, a rectangular shape, or other shape. A plurality of the AIP modules 200 may be arranged on the carrier 210 in a particular pattern, such as illustrated in FIG. 1A or FIG. 1B.

In some embodiments, each of antenna element 202, circuitry 204, amplifier 206, and the spacer structure 208 may be separately fabricated and then assembled together to form the AIP modules. Alternatively, antenna element 202 and circuitry 204 may be fabricated together; circuitry 204 and amplifier 206 may be fabricated together; antenna element 202, circuitry 204, and amplifier 206 may be fabricated together, or the like and then assembled together with the remaining components of the AIP module 200. In some embodiments, a plurality of AIP modules may be fabricated on a single wafer, diced or cut into individual AIP modules, individual AIP modules tested for quality control, and then a support structure may be attached to each AIP module of the plurality of AIP modules that satisfy quality requirements to form a respective plurality of AIP modules.

Such modular approach to fabricating, testing, and/or locating a plurality of antenna elements and associated components/circuitry of a phased array antenna reduces manufacturing cost, weight, and/or the like. A plurality of antenna structures of a phased array antenna need not be fabricated together on a single board configured in the desired arrangement and then tested, in which individual antenna structures deemed defective are electrically isolated from the phased array antenna and not used. To account for manufacturing variances, a certain number of defective antenna structures, or the like, more than a desired number of antenna structures may need to be fabricated on the single board, which adds to the overall cost and weight. Alternatively, locating the antenna elements as well as the associated components/circuitry of the phased array antenna within a module on top of a board avoids having to locate antenna elements directly on top of a board layer and the remaining components/circuitry of the phased array antenna within the board layer and/or requiring additional layers in order to satisfy antenna radiative requirements (e.g., certain distance between antenna radiative element and ground plane).

Figure 2B:
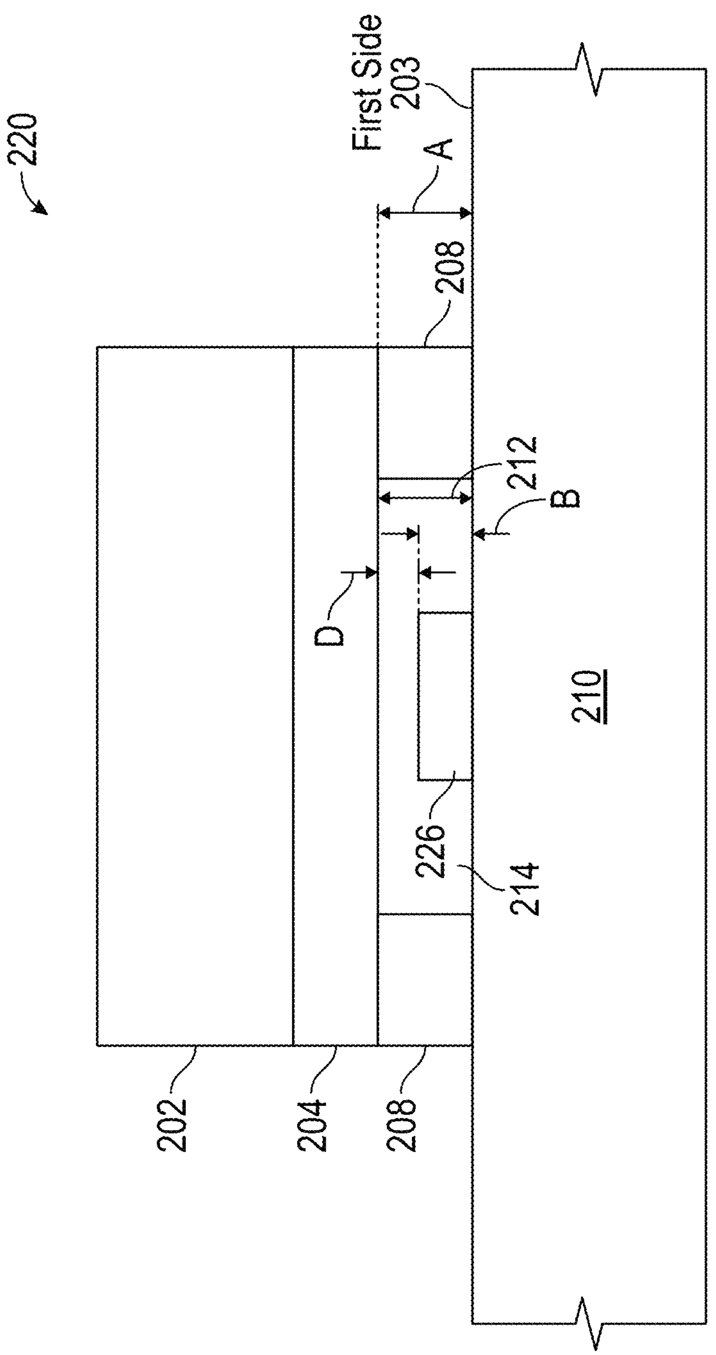
FIG. 2B depicts a block diagram of a cross-sectional side view of an example AIP module according to previously developed technology.

In FIG. 2B, AIP module 220 may be similar to AIP module 200 except that amplifier 226 of AIP module 220 may be attached to a first side 203 of the carrier 210, rather than physically connecting to the underside of circuitry 204, as is shown for amplifier 206 of AIP module 200 in FIG. 2A. Otherwise, amplifier 226 may be similar to amplifier 206. In still other embodiments, as described above for AIP module 200, circuitry 204 may be included with amplifier 226. The amplifier 226 is illustrated with a height B, similar to the amplifier 206 in FIG. 2A. The spacer structure 208 may provide the spacing A between the circuitry 204 and the carrier 210 as well as the spacing D between amplifier 226 and the circuitry 204.

As noted above, in the configurations illustrated in FIG. 2A and FIG. 2B, the spacer structure 208 may comprise a rigid structure coupled to the carrier 210 by coupling elements. In one illustrative example, the coupling elements can comprise solder balls. In other embodiments, the spacer structure 208 may be formed from solder balls and/or pillars. In either of the described embodiments, when the AIP module 200 or 220 is coupled to the carrier, manufacturing variances can result in inconsistent values of the spacings A, C, and/or D. For example, when solder balls are heated to form the physical and/or electrical connections (e.g., during a solder reflow process) between the AIP module 200 or 220 and the carrier 210, the collapsed height of the solder balls can vary between individual AIP modules 200, 220.

Figure 2C:
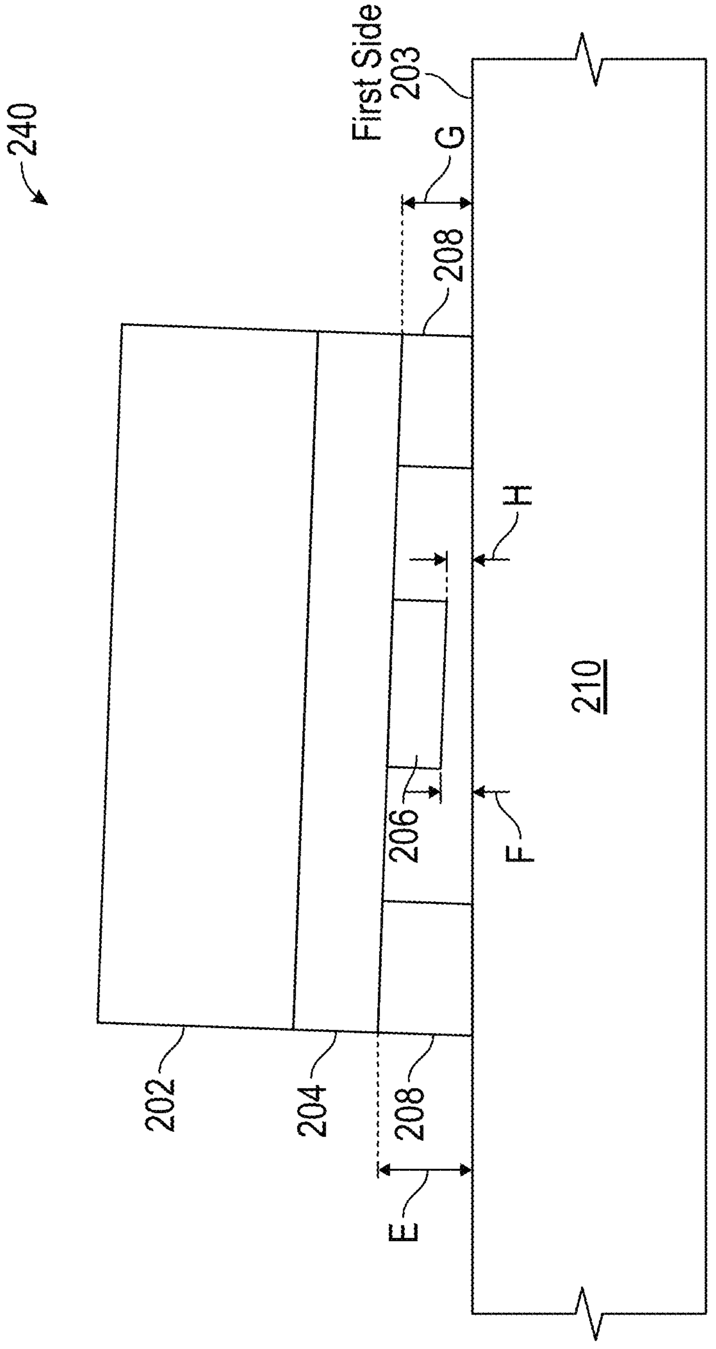
FIG. 2C depicts a cross-section side view of an example manufacturing variance of the AIP module depicted in FIG. 2A.

FIG. 2C illustrates an example AIP module 240 with a manufacturing variance resulting in a laterally unequal height of the spacer structure 208 after installation of the AIP module 200. The AIP module 240 can correspond to the AIP module 200 shown in FIG. 2A. In the illustrated example of FIG. 2C, the spacer height E on the left-hand side of the AIP module 240 is greater than the spacer height G on the right side of the AIP module 240, resulting in the distance F between the left-hand side of amplifier 206 and the carrier 210 greater than a distance H between the right-hand side of amplifier 206 and the carrier 210. Similarly, portions of the circuitry 204 on the right-hand side may be closer to the carrier 210 than portions of the circuitry 204 on the left-hand side. In some embodiments, the spacing between the carrier 210 and the amplifier 206 and/or circuitry 204 can affect the RF characteristics of the circuitry 204, amplifier 206, and/or other electronic components (not shown), such as RF filters, modulators/demodulators, oscillators, or the like disposed within the cavity 214 of the AIP module 240. Each AIP module can have a slightly varying height and/or tilt relative to the carrier 210, which can result in performance mismatch between the AIP modules of the antenna lattice, which can in turn degrade the overall performance of the phased array antenna. For example, the amplifier 206 and/or circuitry 204 of AIP module 200 shown in FIG. 2A may exhibit different performance characteristics when compared with the amplifier 206 and/or circuitry 204 of AIP module 240 shown in FIG. 2C. In some cases, a performance difference between different AIP modules can result from a non-uniform environment for the amplifier 206 and/or circuitry 204, such as different impedances seen by each respective amplifier 206 and/or circuitry 204 based on the relative distance of conductors and other materials included in the carrier 210.

Figure 2D:
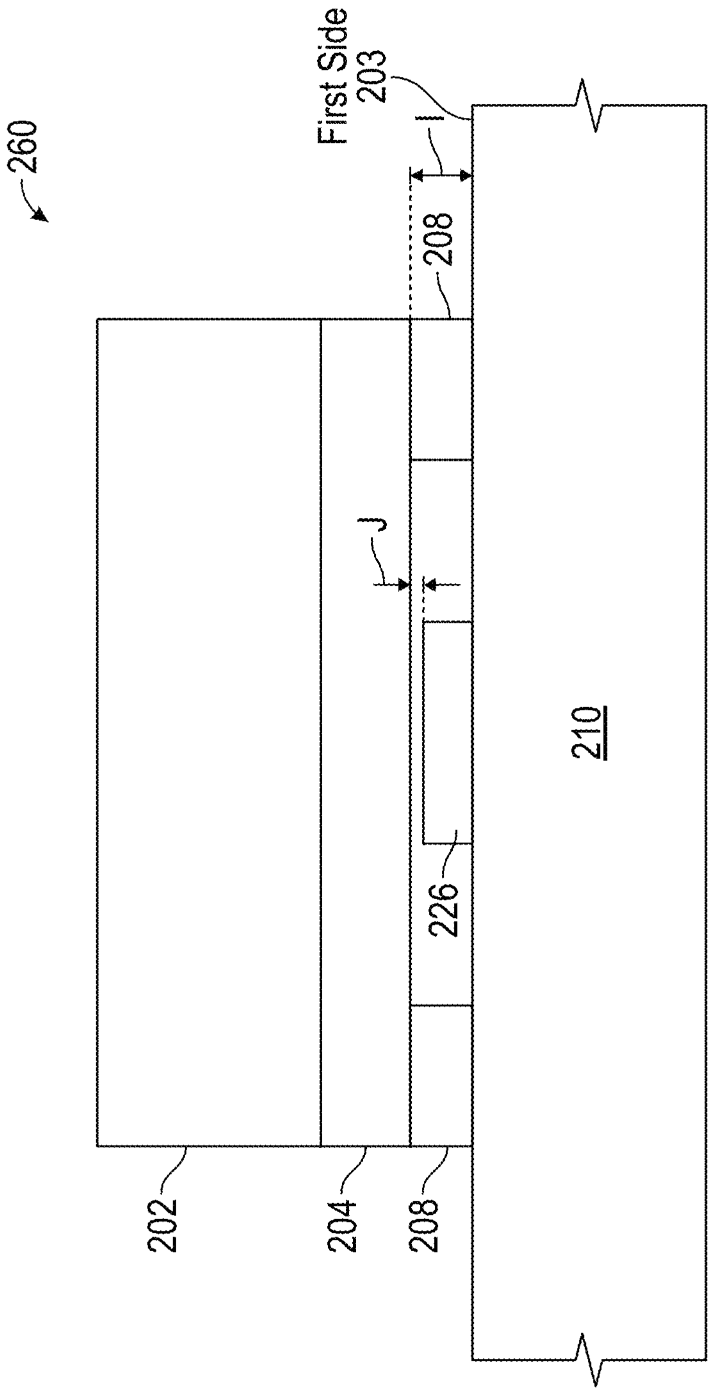
FIG. 2D depicts a cross-section side view of an example manufacturing variance of the AIP module depicted in FIG. 2B.

FIG. 2D illustrates an example of AIP module 260 with a manufacturing variance resulting in a laterally equal but collapsed height I of the spacer structure 208 relative to the spacer structure 208 of AIP module 220 shown in FIG. 2B. The AIP module 260 can correspond to the AIP module 220 shown in FIG. 2B. As illustrated, the spacing I of AIP module 260 is significantly reduced compared to the spacing D of AIP module 220 shown in FIG. 2B. As a result, the spacing J between amplifier 226 and circuitry 204 is illustrated as being uniform from left to right, but the amplifier 226 and circuitry 204 are nearly in contact. As described above with respect to FIG. 2C, each AIP module can have varying height and/or tilt, which can result in performance mismatch between AIP modules of the phased array antenna, which can in turn degrade the overall performance of the phased array antenna.

Figure 2E:
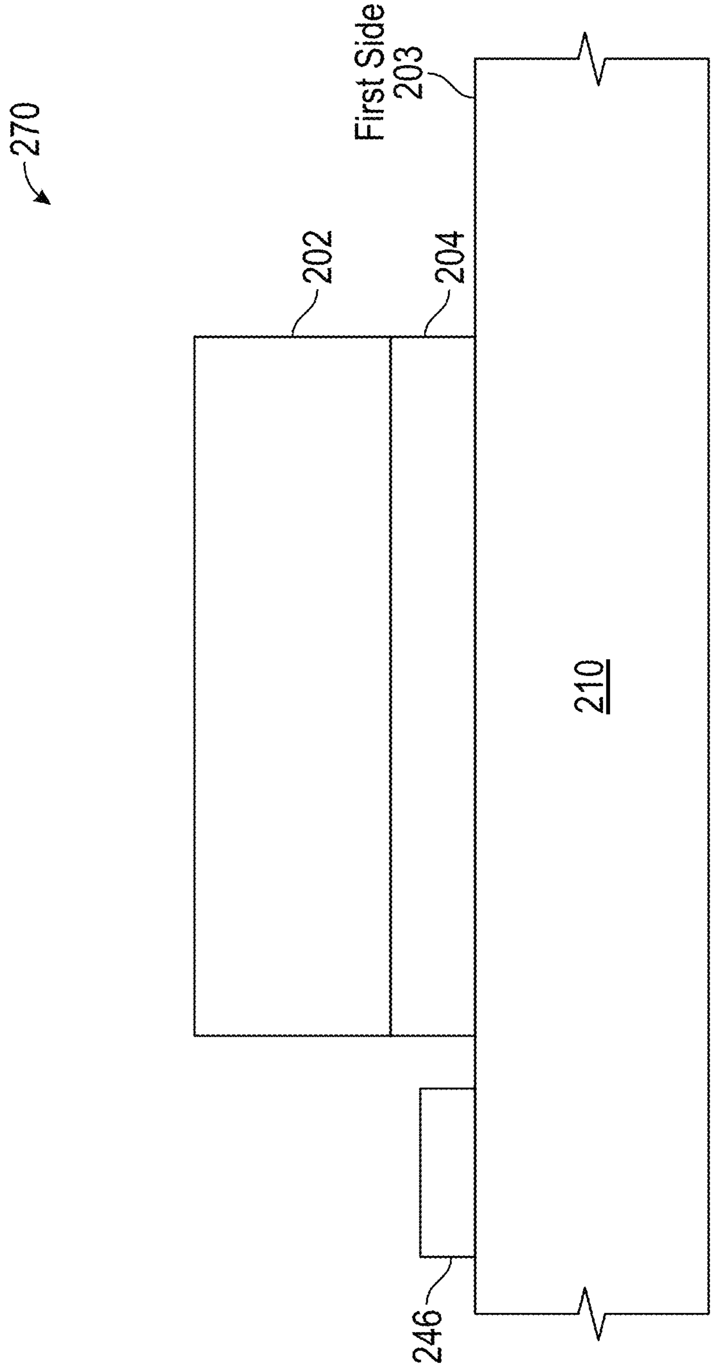
FIG. 2E (Prior Art)
FIG. 2E depicts a block diagram of a cross-sectional side view of an example AIP module according to previously developed technology.

FIG. 2E illustrates AIP module 270 that may be similar to AIP module 200 with an adjacent amplifier 246. As illustrated in FIG. 2E, circuitry 204 may be disposed between antenna element 202 and carrier 210. Circuitry 204 of AIP module 270 may physically couple to the first side 203 of carrier 210. Amplifier 246 may also physically and/or electrically couple to the top of carrier 210, rather than coupling to the circuitry 204, as is the case with amplifier 206 of AIP module 200 (see FIG. 2A). With antenna element 202/circuitry 204 and amplifier 246 located adjacent to each other on the first side 203 of carrier 210, the overall footprint of AIP module 270 and amplifier 246 may be greater than the width of AIP module 200 (see FIG. 2A). In some cases, separating the amplifier (e.g., amplifier 206 of FIG. 2A) from the circuitry 204 can eliminate the need for redundant layers in the AIP module 270, which can reduce cost and weight of the AIP module 280.

Figure 2F:
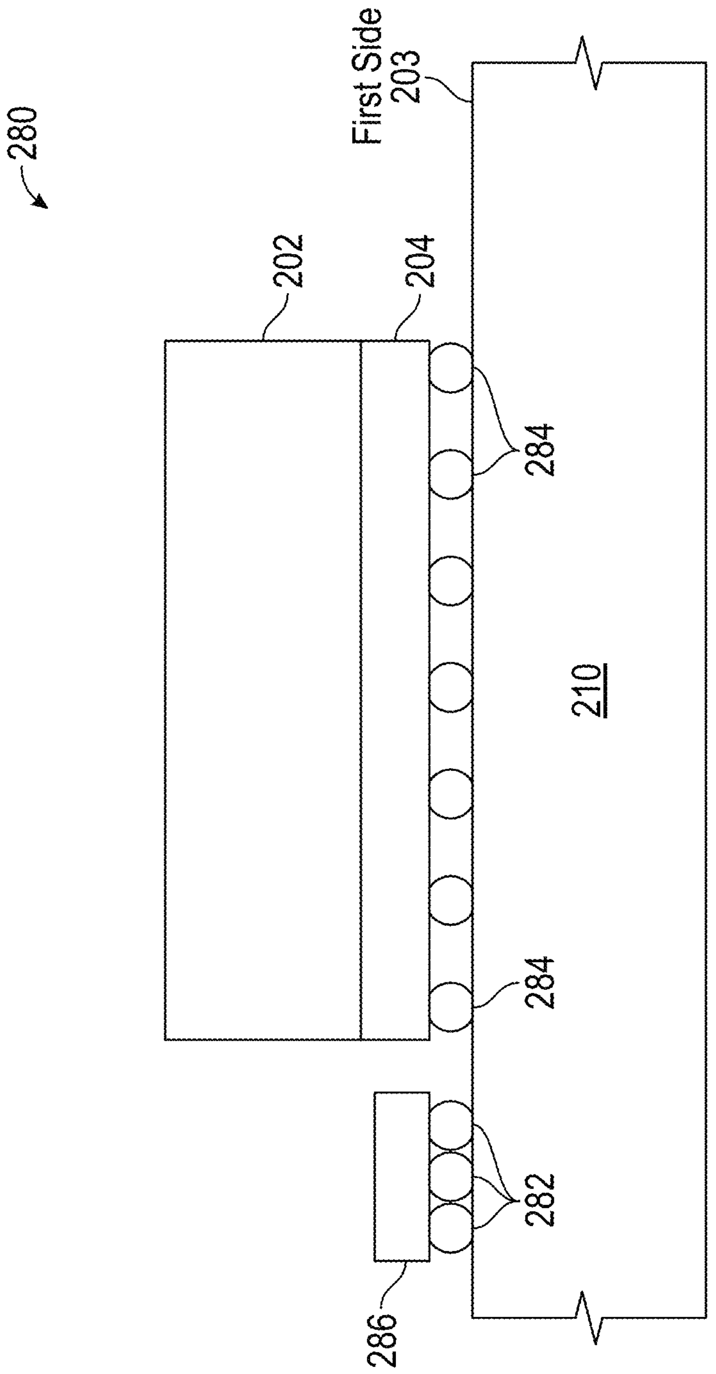
FIG. 2F depicts a block diagram of a cross-sectional side-view of an example AIP module according to examples of the present disclosure.

FIG. 2F illustrates AIP module 280 with adjacent amplifier 286 which can be similar to and perform similar functions as AIP module 280 and adjacent amplifier 246 shown in FIG. 2E, respectively. FIG. 2F illustrates example coupling elements 282,284. In one illustrative example, the coupling elements 282 and coupling elements 284 can include solder balls. Coupling elements 282 can physically and/or electrically couple the amplifier 286 to the first side 203 of the carrier 210. Coupling elements 284 can physically and/or electrically couple the circuitry 204 to the first side of the carrier 210. In some cases, other electronic components (not shown) such as RF filters, beamformers, modulators/demodulators, oscillators, or the like can be coupled to the first side 203 of the carrier 210 by coupling elements (not shown). As discussed above with respect to FIG. 2C and FIG. 2D, manufacturing variances can result in the coupling elements 282, 284 having different heights resulting in inconsistent spacings between the carrier 210 and AIP modules 280, amplifiers 286, and/or other circuitry (not shown) at different portions of the phased array antenna, such as phased array antenna 120 of FIG. 1A.

In some embodiments, the circuitry and/or amplifier of AIP modules (e.g., AIP module 200, 220, and/or 240) may be configured to provide a gain in the range of approximately 25 dB to incident electromagnetic waves received by the antenna (e.g., radiation) in a receiving phased array antenna, or a gain in the range of approximately 22 dB to electromagnetic waves to be transmitted by the antenna in a transmitting phased array antenna. In some cases, in addition to such received signal propagating along the signal pathway from the antenna to the carrier, signal leakage or coupling may also occur from circuitry/amplifier back to antenna. Signal leakage or coupling may cause a closed amplification loop to be created. Sufficient amplification, in turn, may result in generation of undesirable oscillation for the AIP module.

Figure 2G:
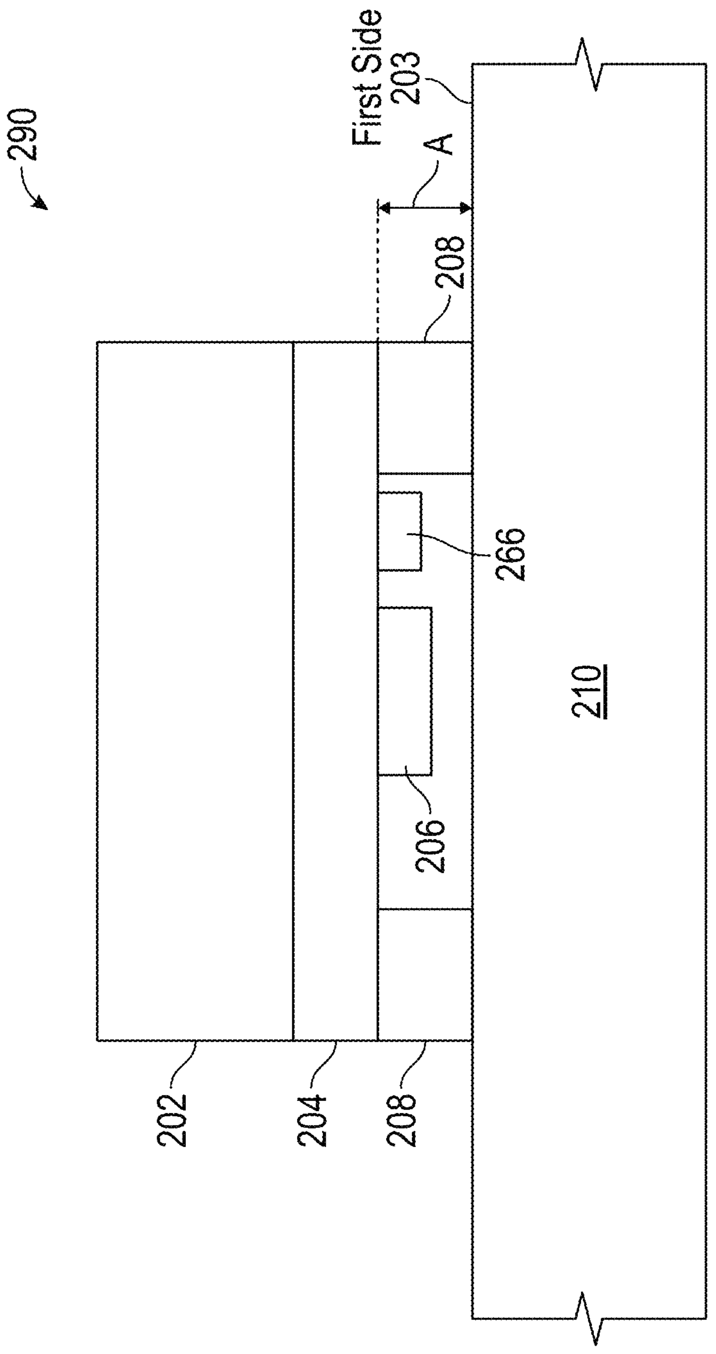
FIG. 2G depicts a block diagram of a cross-sectional side view of an example AIP module according to examples of the present disclosure.

FIG. 2G illustrates AIP module 290 that may be similar to AIP module 200 shown in FIG. 2A with the addition of a filter module 266 disposed adjacent to the amplifier 206 and coupled to the circuitry 204. The filter module 266 can be configured as a pre-amplifier filter or as a post-amplifier filter. While the filter module 266 is illustrated as a single component coupled to the circuitry 204, AIP module 290 can include one or more additional filter modules (not shown) without departing from the scope of the present disclosure. For example, AIP module 200 can include both a pre-amplifier filter and a post-amplifier filter. Filter modules 266 in each AIP module 290 included in a phased array antenna (e.g., phased array antenna 120 shown in FIGS. 1A and 1B) may exhibit different performance characteristics as a result of manufacturing variations as shown with respect to FIG. 2C and FIG. 2D. For example, the frequency bands filtered by each respective filter module 266 may be shifted by different amounts for each AIP module 290 in the phased array antenna, resulting in performance degradation for the phased array antenna.

In some cases, a transmitting phased array antenna including the AIP modules 290 may transmit more power in frequency bands that each respective filter module 266 is designed to reject. In another example, variations in the frequency bands filtered by each respective filter module 266 may cause a transmitting phased array antenna to transmit less power in the transmitting frequency bands that each respective filter module 266 is designed to allow to pass through and/or transmit power in frequency bands that each respective filter module 266 is designed to block. In addition or alternatively, variations in the frequency bands filtered by each respective filter module 266 may cause a receiving phased array antenna to receive less power in the receiving frequency bands that each respective filter module 266 is designed to allow to pass through and/or receive more power in the frequency bands that each respective filter module 266 is designed to block. In some cases, degradation of the performance of a phased array antenna system due to manufacturing variations can be measured in terms of insertion loss associated with each respective filter module 266. The previously provided examples of performance degradation may cause the phased array antenna to violate one or more constraints and/or interfere with other communications systems. Illustrative examples of one or more constraints on a phased array antenna may include minimum transmitted power in the direction of the steering angle and/or minimum receiving sensitivity in the direction of the steering angle. Illustrative examples of interference with other communications systems may include one or more of the following: potential interference with geostationary (GEO) communication systems; potential interference with other (e.g., non-GEO) potential satellite communication systems, and regulatory constraints, such as FCC frequency allocations. In addition, there may be other constraints on the system to be defined in the future that can be affected by manufacturing variations for AIP modules in a phased array antenna system.

Figure 3A:
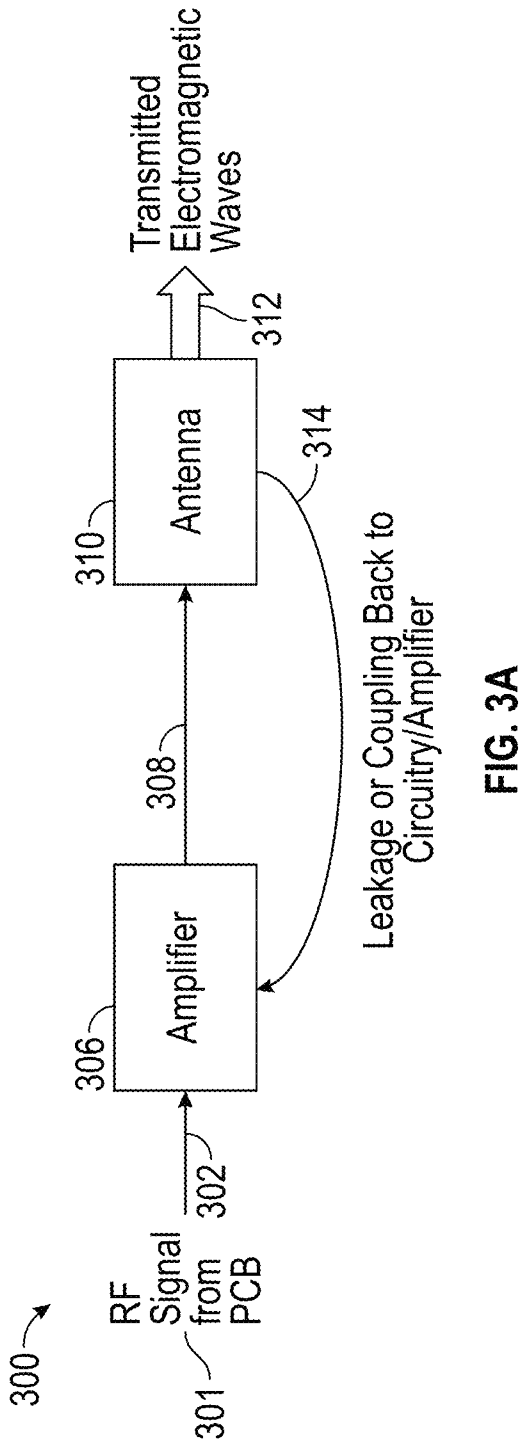
FIG. 3A depicts a block diagram showing a signal leakage or coupling loop associated with an AIP module included in a transmitter antenna lattice according to some embodiments of the present disclosure.
Figure 3B:
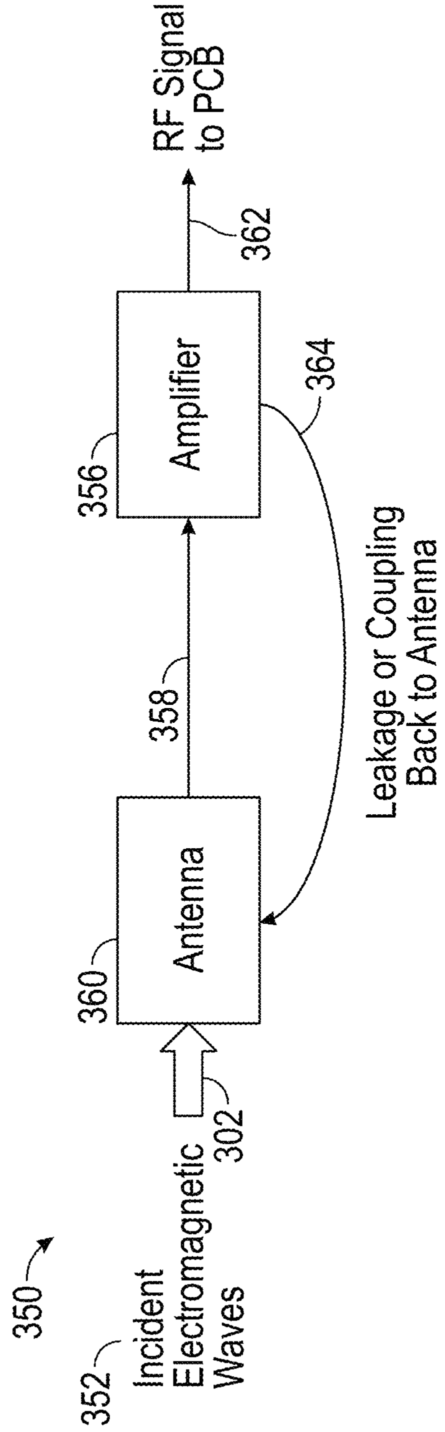
FIG. 3B depicts a block diagram showing a signal leakage or coupling loop associated with an AIP module included in a receiver antenna lattice according to some embodiments of the present disclosure.

FIG. 3A and FIG. 3B illustrate examples of signal leakage or coupling between circuitry and/or the amplifier and the antenna in an AIP module.

FIG. 3A illustrates an example block diagram 300 of an AIP module included in a transmitting phased array antenna. The amplifier 306 can correspond to amplifier 206 shown in FIG. 2A, respectively and the antenna 310 can correspond to antenna element 202. The circuitry/amplifier 304/306 shown in FIG. 3A receives an RF signal 301 from the carrier (e.g., the PCB of the transmitting phased array antenna) through a signal pathway 302 and can perform signal conditioning on the received signal including, without limitation, filtering and amplification. The output of the circuitry/amplifier 304/306 may be coupled to an antenna 310 by a signal pathway 308. The antenna may be stimulated by the output of the amplifier 306 to transmit electromagnetic waves 312. In some cases, a portion of the energy from the transmitted electromagnetic waves can leak or couple back to the amplifier 306 through a signal leakage or coupling path 314. The electromagnetic waves returning to the amplifier 306 through the signal leakage or coupling path 314 may create a closed amplification loop. With sufficient amplification by the amplifier 306 and coupling through the signal leakage or coupling path 314, the transmit configuration shown in FIG. 3A may become unstable and in some cases may experience oscillation.

FIG. 3B illustrates an example block diagram 350 of an AIP module included in a receiving phased array antenna. The antenna 360 can correspond to antenna element 202 and the amplifier 356 can correspond to amplifier 206. The antenna 360 can receive incident electromagnetic waves 352. The incident magnetic waves can couple to the amplifier 356 through a signal pathway 358. The output of the amplifier 356 may be sent to the carrier (e.g., a PCB of the receiving phased array antenna) through signal pathway 362. In some cases, a portion of the received energy amplified by the amplifier 356 can couple back to the antenna 360 through a signal leakage or coupling path 364. The signal picked up by the antenna 360 through the signal leakage or coupling path 364 can be amplified by the amplifier 356 and may create a closed amplification loop. With sufficient amplification by the amplifier 356 and coupling through the signal leakage or coupling path 364, the receive configuration may become unstable and in some cases may experience unwanted oscillation.

In some cases, an AIP module that includes a spacer structure 208 (e.g., AIP module 200 or 220) can include shielding conductors to block, eliminate, or otherwise address the signal leakage or coupling through signal leakage or coupling paths 314, 364. For example, the spacer structure 208 can include one or more shielding vias that can reduce the amount of coupling through the signal leakage or coupling paths 314, 364. In the case of AIP module 200 and AIP module 220, where the amplifiers 206, 226 are located within the cavity formed by the spacer structure 208, shielding vias may be included around the periphery of the spacer structure 208 to address the signal leakage or coupling.

Referring to FIG. 2F the signal coupling or leakage between the amplifier 246 and the antenna element 202 may increase as a result of a lack of shielding between the antenna element 202 and the amplifier 286 and/or the amplifier 246 and the carrier 210 (e.g., the PCB).

Multiple Module Configuration

In some embodiments, a multiple module configuration may be used to address both the non-uniform environment experienced by circuitry and/or amplifiers described with respect to FIGS. 2C, 2D, 2F, and 2G as well as addressing the signal coupling or leakage described with respect to FIG. 3A and FIG. 3B.

Figure 4A:
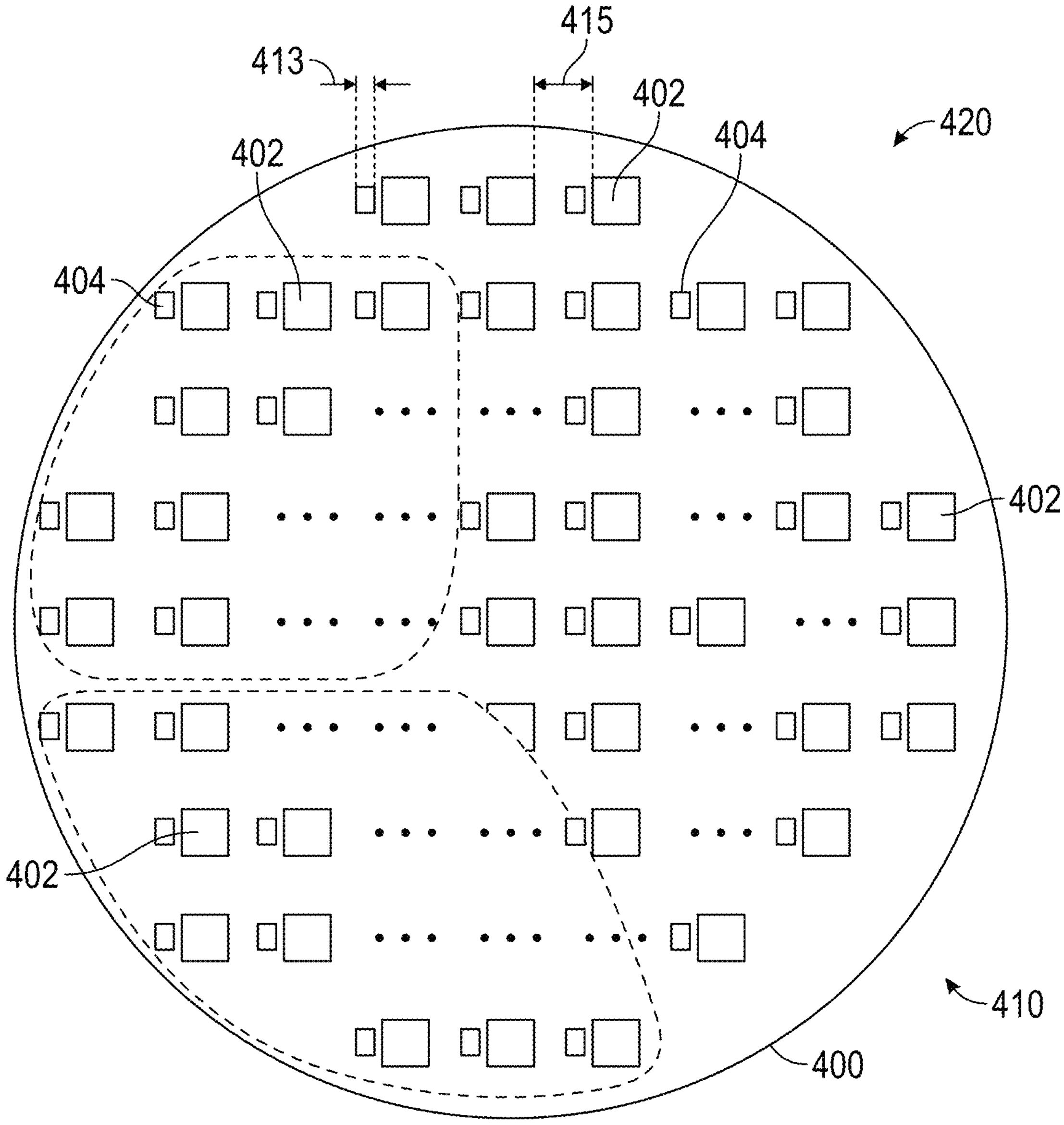
FIG. 4A is an example illustration of a top view of an antenna lattice including a plurality of AIP modules and a plurality of signal conditioning system in package (SCSIP) modules according to some embodiments of the present disclosure.

FIG. 4A illustrates a top view of a portion of a phased array antenna 420. FIG. 4A depicts an antenna lattice 400 including antenna modules 402 and signal conditioning modules 404 arranged on the surface of a carrier 410. The antenna modules 402 and signal conditioning modules 404 can collectively provide at least a portion of (or all of) the functionality of the AIP module 200 shown in FIG. 2A. For example, the antenna module 402 can include an antenna element similar to antenna element 202 shown in FIG. 2A. The antenna element of antenna module 402 may include a dipole antenna, a patch antenna, a slot antenna, a micro-strip antenna, a uni-directional antenna, or the like. The signal conditioning modules 404 can include one or more signal conditioning elements including active circuitry or components (such as amplifiers) and passive circuitry or components (such as capacitors, inductors, resistors, conductive traces, ferrite beads, RF filters, or the like). More detailed descriptions of example signal conditioning modules 404 are described with respect to FIG. 5A through FIG. 5C and FIG. 6A through FIG. 6B below.

As described above with respect to FIG. 2A, the benefits to fabricating, testing, and/or locating a plurality of antenna elements (e.g., antenna modules 402) and associated components/circuitry (e.g., signal conditioning modules 404) of a phased array antenna as modular components can equally apply to a multiple module configuration of a phased array antenna. For example, instead of including redundant antenna elements that can act as replacements for non-functional antenna elements in an integrated antenna approach, faulty antenna modules 402 may be removed and replaced. Similarly, faulty signal conditioning modules 404 may be removed and replaced without requiring additional redundant circuitry on the phased array antenna PCB (e.g., carrier 410). In addition, with the multiple module configuration, a design change to the signal conditioning module may be accomplished without redesigning an entire AIP module 200, 220, 260, and 270 (see the embodiments of FIGS. 2A, 2B, 2E, and 2G) but instead may only require a redesign of the signal conditioning modules 404. In some cases, the antenna modules 402 and signal conditioning modules 404 may be interspersed within the antenna array. In the illustration of FIG. 4A, the antenna modules 402 and signal conditioning modules 404 are arranged in an alternating pattern. Each of the signal conditioning modules 404 may be electrically coupled and/or electrically couplable to one or more adjacent antenna modules 402. By interspersing the signal conditioning modules 404 between antenna modules 402, the length of routing traces between signal conditioning modules 404 and antenna modules 402 (and any associated loss) may be minimized.

One constraint that can result from the separation of a single AIP (e.g., AIP modules 200 and 220 of FIGS. 2A and 2B) into two separate modules is that the surface area on carrier 410 occupied by a single AIP module of the phased array antenna 420 (e.g., included in antenna lattice 400) must be shared by two (or more) separate modules. As described above with respect to Equation (1), the maximum spacing $d_{max}$ for a particular designed maximum scan angle $\theta_{max}$ can determine the maximum available space between adjacent antenna modules. As shown in FIG. 4A, the signal conditioning modules 404 may be designed to fit within spacing 415 between adjacent antenna modules 402. In the illustrated example of FIG. 4A, the signal conditioning modules 404 have shape where the widest width region 413 of the signal conditioning module is less than the spacing 415 between adjacent antenna modules 402. The signal conditioning modules 404 can have any shape, such as rectangle, square, round, oval, or the like without departing from the scope of the present disclosure.

Figure 4B:
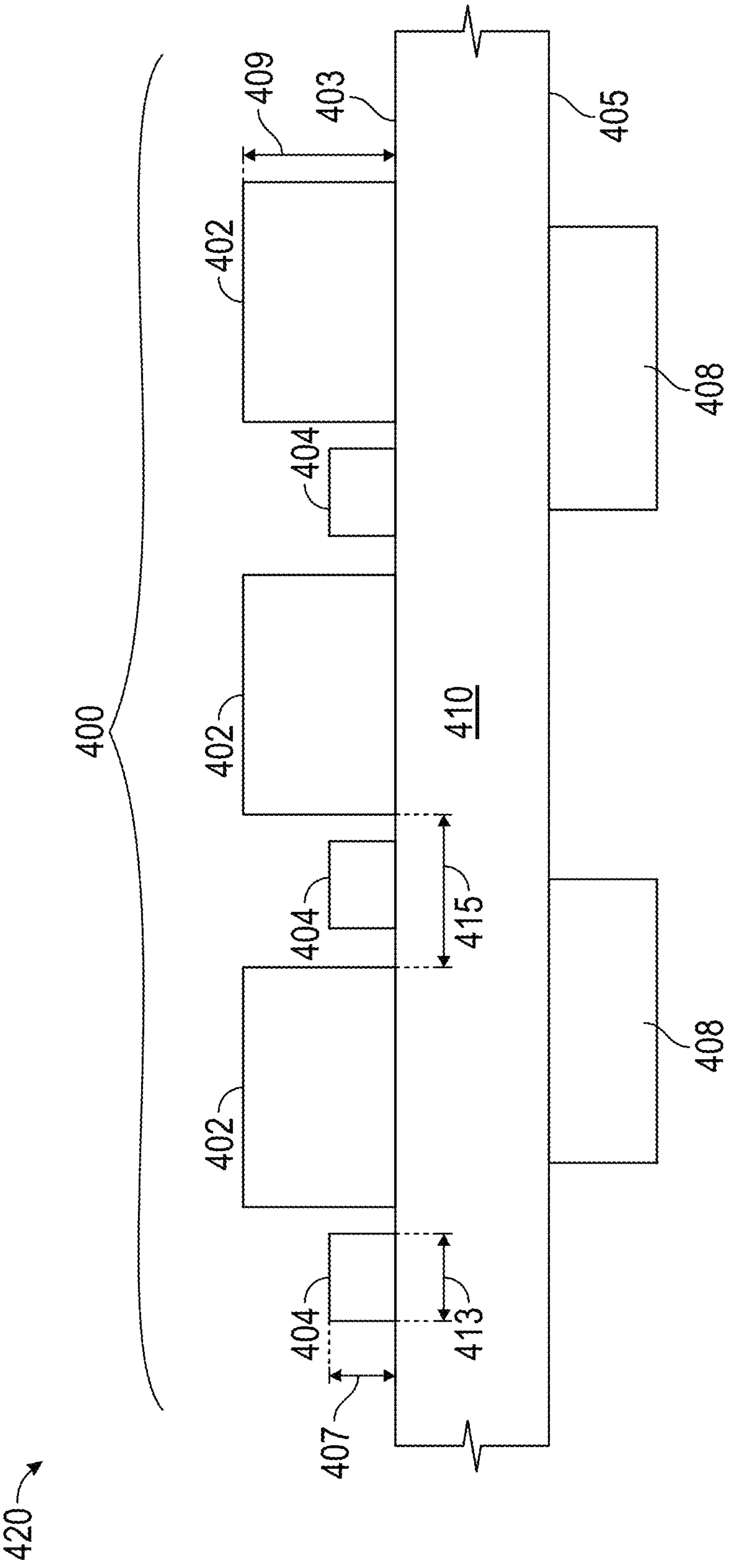
FIG. 4B is an example illustration of a cross-sectional view of phased array antenna according to some embodiments of the present disclosure.

FIG. 4B illustrates a cross-sectional view of a portion of the phased array antenna 420, which includes the antenna lattice 400 shown in FIG. 4A. In the illustrated example, the signal conditioning modules 404 have a height 407 that is less than the antenna module height 409 of the antenna modules 402. In some cases, the antenna module height 409 may be constrained by a minimum distance between the antenna element in the antenna module 402 and one or more conductive layers, such as ground layers, power planes, routing layers, or the like included as part of the carrier 410. In some cases, because the signal conditioning elements included in signal conditioning modules 404 do not need to transmit and/or receive electromagnetic waves over the air, the height of the signal conditioning modules 404 may not be similarly constrained by minimum spacing to the carrier 410, allowing for the signal conditioning modules 404 to be smaller in height and formed from fewer PCB layers. In some embodiments, the signal conditioning modules 404 can have the same height and/or greater height compared to the antenna modules 402 without departing from the scope of the present disclosure. In some cases, the overall weight of a signal conditioning module 404 and an antenna module 402 can be less than a single AIP module 200, 220 that provides effectively the same functionality. This can be achieved by obviating the need for redundant layers to provide physical separation between the amplifier module and the antenna element in an AIP, as described above with respect to AIP module 200 shown in FIG. 2A above. FIG. 4B also illustrates additional components 408 disposed on a second side 405 of the carrier 410 opposite the first side 403 of the carrier. The additional components 408 can include, without limitation, beamformers, RF filters, modulators/demodulators, oscillators, or the like.

Figure 5A:
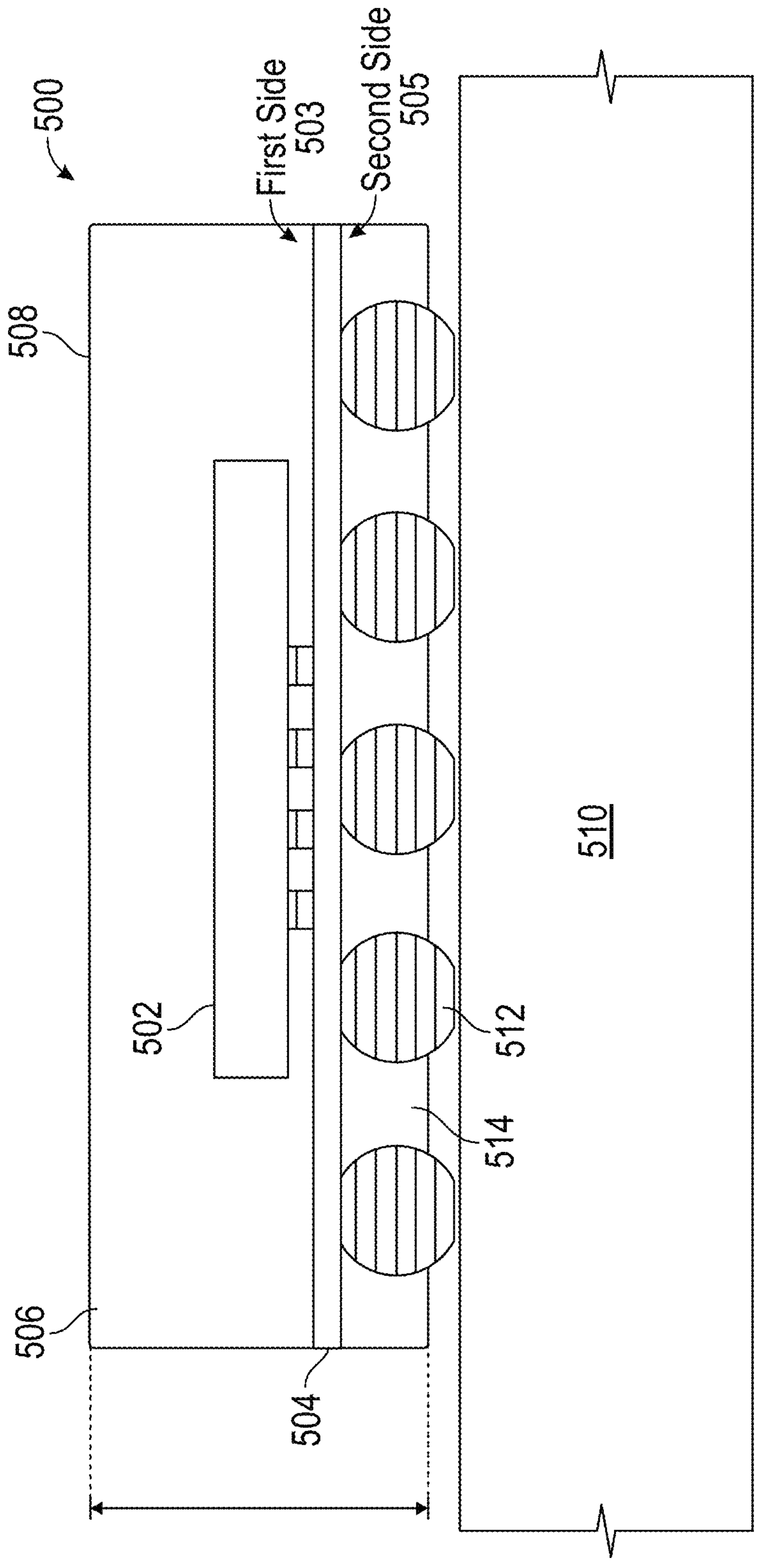
FIG. 5A depicts a block diagram of a cross-sectional side view of an example signal conditioning system in package (SCSIP) module according to some embodiments of the present disclosure.

FIG. 5A depicts a block diagram of a cross-sectional side view of an example signal conditioning system in package (SCSIP) module 500 (e.g., signal conditioning modules 404) in accordance with some embodiments of the present disclosure. SCSIP module 500 may include, without limitation, one or more signal conditioning elements 502, support structure 504, isolation material 506, shield 508, and coupling elements 512. The one or more signal conditioning elements 502 may be disposed at a first side 503 of the support structure 504. Coupling elements 512 may be disposed at a second side 505 of the support structure 504, opposite the first side 503 of the support structure 504. In some cases, the SCSIP module 500 can optionally include a second isolation material 514 disposed at the second side 505 of the support structure 504.

Signal conditioning elements 502 can include one or more electrical components, RF circuitry, electronic circuitry, passive electrical elements (e.g., inductors, capacitors, resistors, ferrite beads, etc.), electrically conductive traces, and/or the like. Although signal conditioning elements 502 are illustrated as a single component (e.g., a single IC chip) coupled to the support structure 504, the signal conditioning elements 502 can include multiple components (e.g., multiple IC chips, surface mounted components, or the like). In one illustrative example for a transmitting phased array antenna, the signal conditioning elements 502 can include a pre-PA filter, a PA, and a post-PA filter. In another illustrative example for a receiving phased array antenna, the signal conditioning elements 502 can include an LNA, and a post-LNA filter, and optionally can include a pre-LNA filter.

Support structure 504 can include one or more layers (e.g., PCB layers) including electronic circuitry, passive electrical elements (e.g., inductors, capacitors, resistors, ferrite beads, etc.), electrical conductive traces, and/or the like configured to facilitate signal propagation between and among signal conditioning elements 502, shield 508, and/or coupling elements 512 without undue signal degradation or distortion. In some cases, support structure 504 can provide impedance matching between signal conditioning elements 502 and one or more antennas (e.g., antenna modules 402). In some cases, the support structure 504 can include a grounded conductor (e.g., a ground layer or ground plane) disposed between the signal conditioning elements 502 and the carrier 510. In some cases, the grounded conductor can electrically isolate the signal conditioning elements 502 from the carrier 510 (e.g., from electrical conductors or other materials disposed on the carrier 510). By electrically isolating the signal conditioning elements 502 from the carrier 510 using the support structure, the performance of the signal conditioning elements 502 can be unaffected by variations in the spacing between the SCSIP module 500 and the carrier 510, for example, due to variations in the heights of solder balls as described with respect to FIG. 2C and FIG. 2D above.

Isolation material 506 can include one or more layers of non-conductive material. For example, non-conductive materials that may be used for the layers of the isolation material 506 can include, without limitation, plastics, dielectrics, epoxy, or the like. In some cases, the isolation material 506 can have a coefficient of thermal expansion (CTE) that prevents unbalanced forces from being applied to the support structure 504, the signal conditioning elements 502, and/or any other components that may be included in the SCSIP module 500 during temperature cycling. The isolation material 506 can form a protective layer above the support structure 504. For example, the isolation material 506 may partially or completely envelop the signal conditioning elements 502. As shown in the illustration of FIG. 5A, the isolation material 506 may be formed as a rectangular box (or rectangular cuboid) coupled to the first side 503 of the support structure 504. In some cases, the isolation material 506 can extend to the edges of the support structure 504 as shown in FIG. 5A. In some cases, the isolation material 506 may be disposed over less than the full surface area of the first side 503 of the support structure 504 and may contain gaps between sections of the isolation material 506. The physical dimensions of the isolation material 506 may be well controlled during manufacturing. For example, the isolation material 506 may be formed using an injection molding, overmolding, conformal coating and/or any other process that produces consistent dimensions of the isolation material 506.

Shield 508 may be a conductive layer that is disposed onto the isolation material 506. The shield 508 may provide isolation to prevent electromagnetic waves (e.g., RF signals) originating outside of the SCSIP module 500 from reaching the signal conditioning elements 502. For example, the shield 508 may be used to prevent coupling or leakage between antenna modules 402 and the signal conditioning elements 502 as described with respect to FIG. 3A and FIG. 3B above. In some cases, the shield 508 may be electrically coupled to a conductor included in or on the support structure 504. For example, the shield 508 may be electrically coupled to a conductor on either the top side of the support structure 504, the bottom side of the support structure 504, an edge of the support structure 504, or the like. In some cases, the conductor included in or on the support structure 504 may be electrically coupled to a ground plane such that when the shield 508 connects to the ground plane the shield 508 can also be grounded. In some cases, the shield 508 may be a floating conductor. In some cases, the shield 508 may be a thin film metal deposited on the external surfaces of the isolation material 506. For example, without limitation, the shield 508 may be deposited using a metal sputtering technique, chemical vapor deposition, electron beam evaporation, or any other technique for depositing metal onto a surface and/or applying a metallic surface coating.

In some cases, the shield 508 in combination with the support structure 504 can form a continuous enclosure around the signal conditioning elements 502. In some cases, the shield 508 may be disposed on the isolation material 506 with one or more gaps. In such cases, the shield 508 can operate analogous to a faraday cage to block electromagnetic waves originating outside of the SCSIP module 500 as long as the gaps are sufficiently small at the transmit and/or receive frequency bands of the phased array antenna to prevent electromagnetic waves from coupling to the signal conditioning elements 502 through a coupling or leakage path.

In combination with the isolation material 506, the shield 508 can ensure a consistent environment for the signal conditioning elements 502 within the SCSIP module 500. For example, for multiple SCSIP modules 500 sharing an identical design, each of the signal conditioning elements 502 within the multiple SCSIP modules 500 will be positioned at the same distance (within manufacturing tolerances) of the shield 508 based on consistent dimensions of the isolation material 506. In addition, when the shield 508 is grounded and the support structure 504 also includes a ground plane, the signal conditioning elements 502 may be shielded from leakage and/or coupling with antenna elements of the antenna lattice (e.g., antenna lattice 400) on all sides.

Coupling elements 512 may be physically and/or electrically coupled to carrier 510 (e.g., a PCB of a phased array antenna). In some embodiments, one or more of the coupling elements 512 may be used to provide connections between one or more antenna elements of a phased array antenna and the SCSIP module 500. One or more of the coupling elements 512 can also be used to provide electrical connections to ground, analog or digital signals, DC power, or the like. In the illustrated embodiment, the coupling elements 512 are shown as solder balls.

Second isolation material 514 can optionally be disposed on the second side 505 of the support structure 504, on the same side as the coupling elements 512. In some cases, the second isolation material 514 may be selected to have similar properties (e.g., dielectric coefficient, coefficient of thermal expansion (CTE), etc.) to the isolation material 506.

Figure 5B:
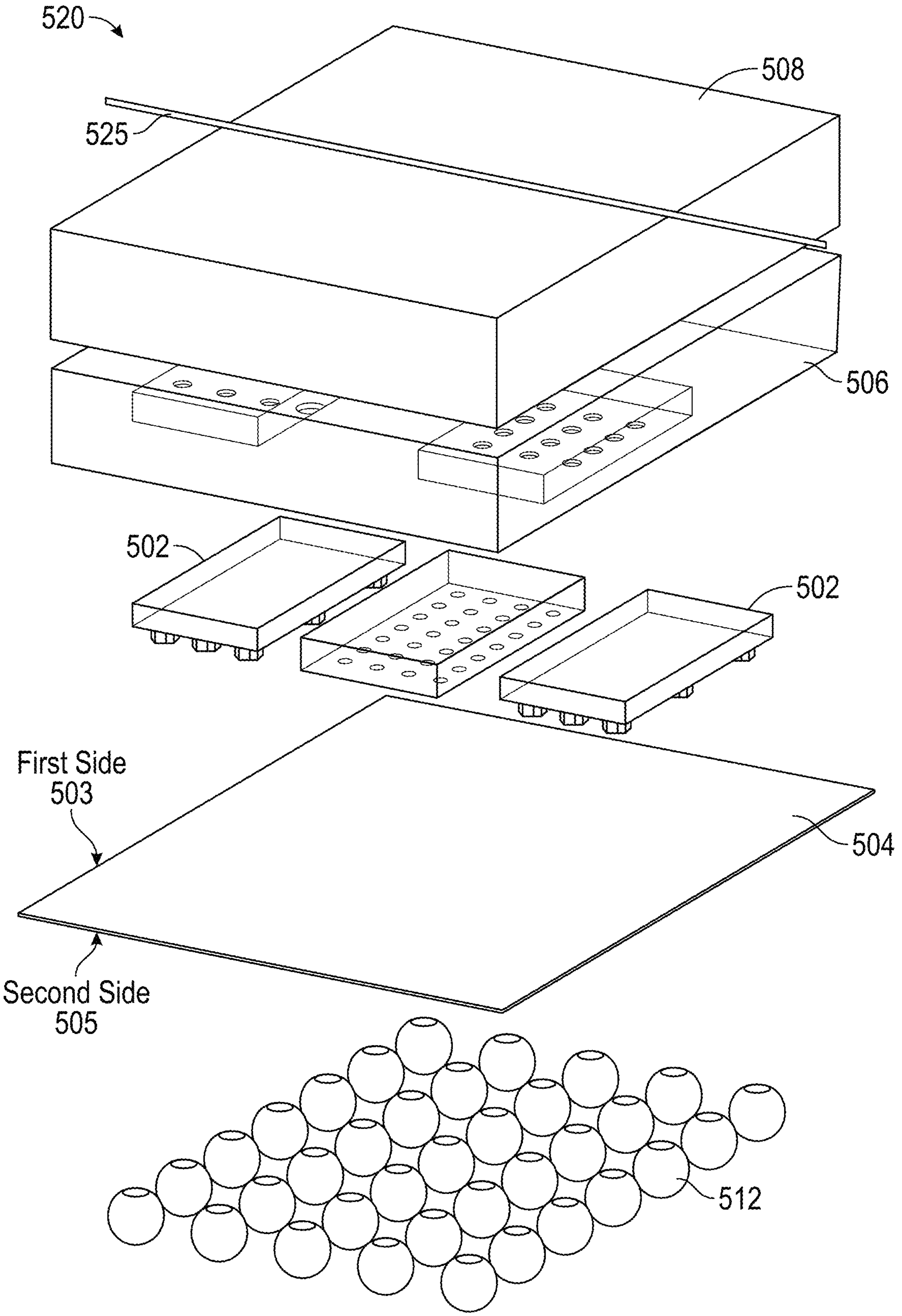
FIG. 5B depicts an exploded perspective view of an example SCSIP module according to some embodiments of the present disclosure.
Figure 5C:
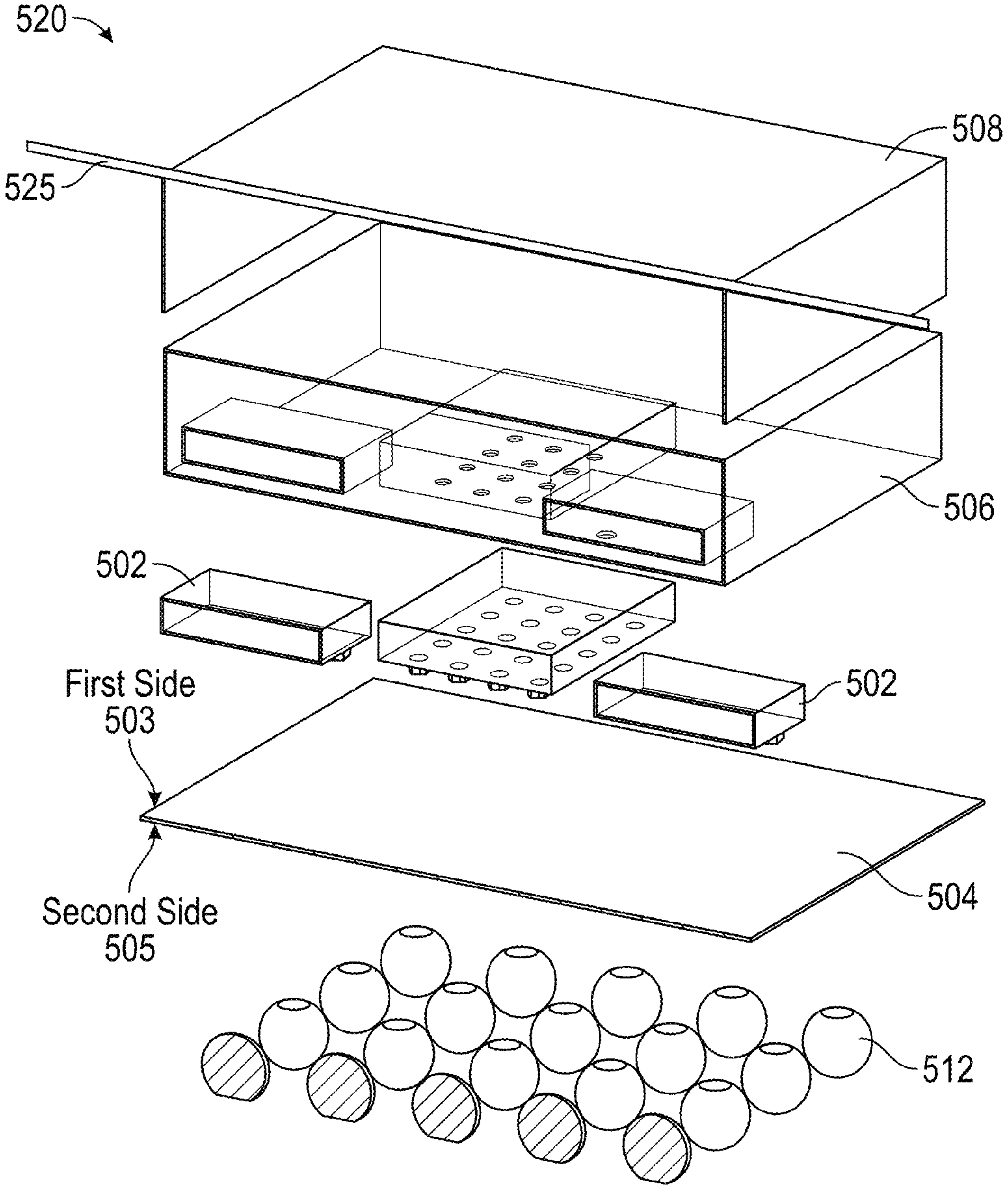
FIG. 5C depicts a cross-section of the exploded perspective view of the example SCSIP module shown in FIG. 5B.

FIG. 5B depicts an exploded perspective view of an example SCSIP module 520 according to some embodiments of the present disclosure. In the illustrated example, shield 508 is a hollow rectangular box with one missing side (similar to a shoe box lid) and has five sides corresponding to the five sides of the solid rectangular box shaped isolation material 506 that are not in contact with the support structure 504. The signal conditioning elements may be physically and/or electrically coupled to a first side 503 of the support structure 504 and enveloped by the isolation material 506. The support structure 504 may be physically and/or electrically coupled to coupling elements 512, which can in turn be coupled to a carrier (e.g., carrier 510). The support structure 504 may include a ground plane and/or routing traces for electrically coupling the signal conditioning elements 502, the coupling elements 512, and the carrier (e.g., the PCB of a phased array antenna). FIG. 5C depicts a cross-section of the exploded perspective view of the example SCSIP module 520 shown in FIG. 5B across the cut line 525. FIG. 5C illustrates how the shield 508 fits over the isolation material 506 to provide isolation from electromagnetic waves originating outside of the SCSIP module 500 in conjunction with the ground plane of the support structure 504. The shield 508 also serves to help provide a uniform environment for the signal conditioning elements 502 in conjunction with the isolation material 506.

Figure 6A:
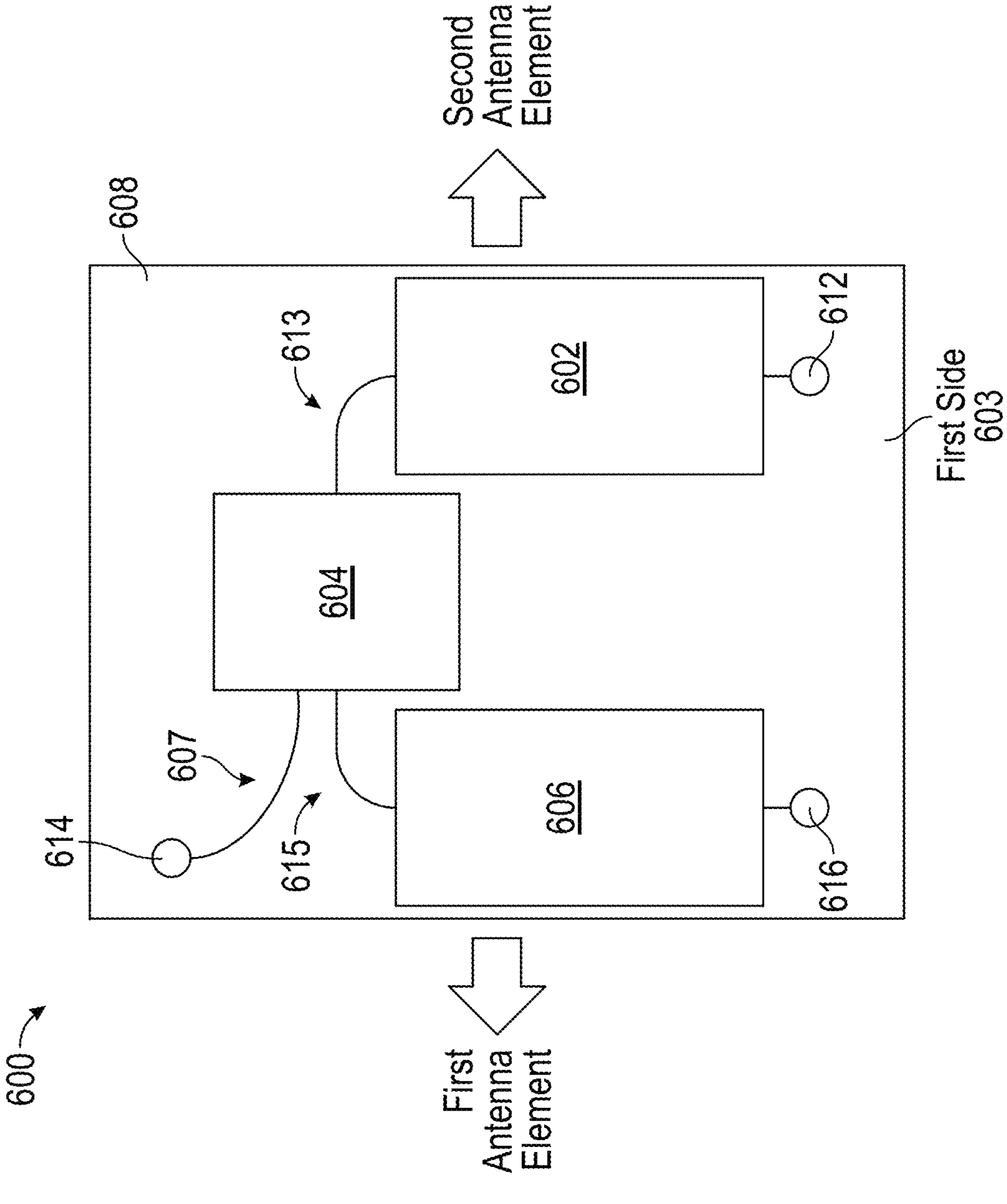
FIG. 6A depicts a block diagram of a top-down view of an example configuration of a SCSIP module in a transmitting phased array antenna according to examples of the disclosure.

FIG. 6A illustrates a top-down view of an illustrative example of a SCSIP module 600. The example SCSIP module 600 in FIG. 6A is illustrated in a configuration for use in a transmitting phased array antenna. The example SCSIP module 600 includes a pre-PA filter 602, PA 604, and post-PA filter 606 all disposed on a first side 603 of support structure 608. The support structure 608 may be a PCB that includes two or more metal layers. The pre-PA filter 602 is electrically coupled to the PA 604 by a routing trace 613. The PA 604 is electrically coupled to the post-PA amplifier by a routing trace 615. The pre-PA filter 602 is electrically coupled to a via 612 which in turn is coupled to a carrier of a phased array antenna (e.g., carrier 510) by a coupling element (e.g., coupling elements 512) disposed at a second side (opposite first side 603) of the support structure 608, opposite the first side 603. The coupling path between the carrier of the phased array antenna and the pre-PA filter 602 through the via 612 and the coupling element may be considered a first input of the SCSIP module 600 operating in a transmitting configuration. The post-PA filter 606 is electrically coupled to a via 616 which is in turn coupled to the carrier of the phased array antenna (e.g., carrier 510) by a coupling element (e.g., coupling elements 512) disposed at the second side (opposite first side 603) of the support structure 608. The coupling path between the post-PA filter 606 and the carrier through the coupling element may be considered a first output of the SCSIP module 600 operating in the transmitting configuration. As shown, the pre-PA filter 602, PA 604, and post-PA filter 606 are arranged to achieve short lengths for the routing traces 613, 615 to minimize signal leakage or loss as well as maintaining an overall width of the antenna module that fits within the spacing 415 between adjacent antenna modules 402 in the antenna lattice 400 as shown in FIG. 4A and FIG. 4B.

In the transmitting configuration, the SCSIP module 600 can receive a transmit signal from the carrier by the first input of the SCSIP module 600, the transmit signal may in turn be filtered by the pre-PA filter 602 and amplified by the PA 604 to generate an amplified transmit signal. The amplified transmit signal may be output from the PA 604 and filtered by the post-PA filter 606 to generate a filtered and amplified transmit signal. The filtered and amplified transmit signal may be routed to a first antenna element of the transmitting phased array antenna (e.g., antenna modules 402) by the first output of the SCSIP module 600 operating in the transmitting configuration.

The pre-PA filter can filter the transmit signal received from the carrier prior to amplification by the PA as noted above. The transmit signal may be associated with a transmit frequency band. For example, the transmit frequency band can include, without limitation Ku band, Ka band, E band or any other frequency band allocated for RF communication. In some embodiments, the pre-PA filter 602 may be configured to filter (e.g., attenuate) the transmit signal in one or more frequency bands associated with radio astronomy (RA) (also referred to as RA band or RA bands herein) to prevent unwanted RA band signal components in the transmit signal received from the carrier 510 from being amplified by the PA. Filtering out the RA band can prevent interference with RA equipment. The pre-PA filter 602 can include, without limitation, a high-pass filter, a low-pass filter, a band-reject filter (or notch filter), a band-pass filter, or the like.

The post-PA filter 606 can be configured to filter the amplified transmit signal as noted above. In some embodiments, the transmitting phased array antenna that includes the example SCSIP module 600 may be located in proximity to one or more receiving phased array antennas in a communication device (not shown). In some embodiments, the communication device can include both the transmitting phased array antenna that includes SCSIP module 500 and the one or more receiving phased array antennas. The post-PA filter 606 may be configured to filter (e.g., attenuate) frequency components that may be included in the amplified transmit signal output from PA 604 in one or more receive bands of the one or more receiving phased array antennas to prevent interference between the transmitting phased array antenna and the one or more receiving phased array antennas. The receive bands of the one or more phased array antennas can include, without limitation, L, S, C, X, Ku, K, Ka, V, W, Q, U, E, F, D, millimeter band, or any other frequency band allocated for RF communication. The post-PA filter 606 can include, without limitation, a high-pass filter, a low-pass filter, a band-reject filter (or notch filter), a band-pass filter, or the like.

The SCSIP module 600 may also optionally be configurable to operate in a calibration receive configuration. In an embodiment that incorporates a calibration receive configuration, the SCSIP module 600 may include a via 614 coupled to the carrier by a coupling element at the second side (opposite the first side 603) of the support structure 608 which in turn is electrically coupled to the carrier (e.g., carrier 510). The via 614 may be electrically coupled to the PA 604 by a routing trace 607. The coupling path between the carrier and the PA 604 through a coupling element may be considered a second input of the SCSIP module 600 in the calibration receive configuration. In the calibration receive configuration, the PA 604 can receive a calibration receive signal from the first antenna element. In some embodiments, the PA 604 may be coupled to control lines (not shown) that can provide commands to the PA 604 to change configurations between the transmit configuration and the calibration receive configuration. In the calibration receive configuration, the PA 604 can output an amplified calibration receive signal to the pre-PA filter 602 through the routing trace 613, and the pre-PA filter 602 can filter the amplified calibration receive signal and generate an amplified and filtered calibration receive signal. The amplified and filtered calibration receive signal can be electrically coupled to the carrier through the via 612 and a coupling element disposed at the second side (opposite the first side 603) of the support structure 608. Accordingly, the first input of the SCSIP module 600 in the transmitting configuration may be considered a second output of the SCSIP module 600 in the receiving configuration.

Figure 6B:
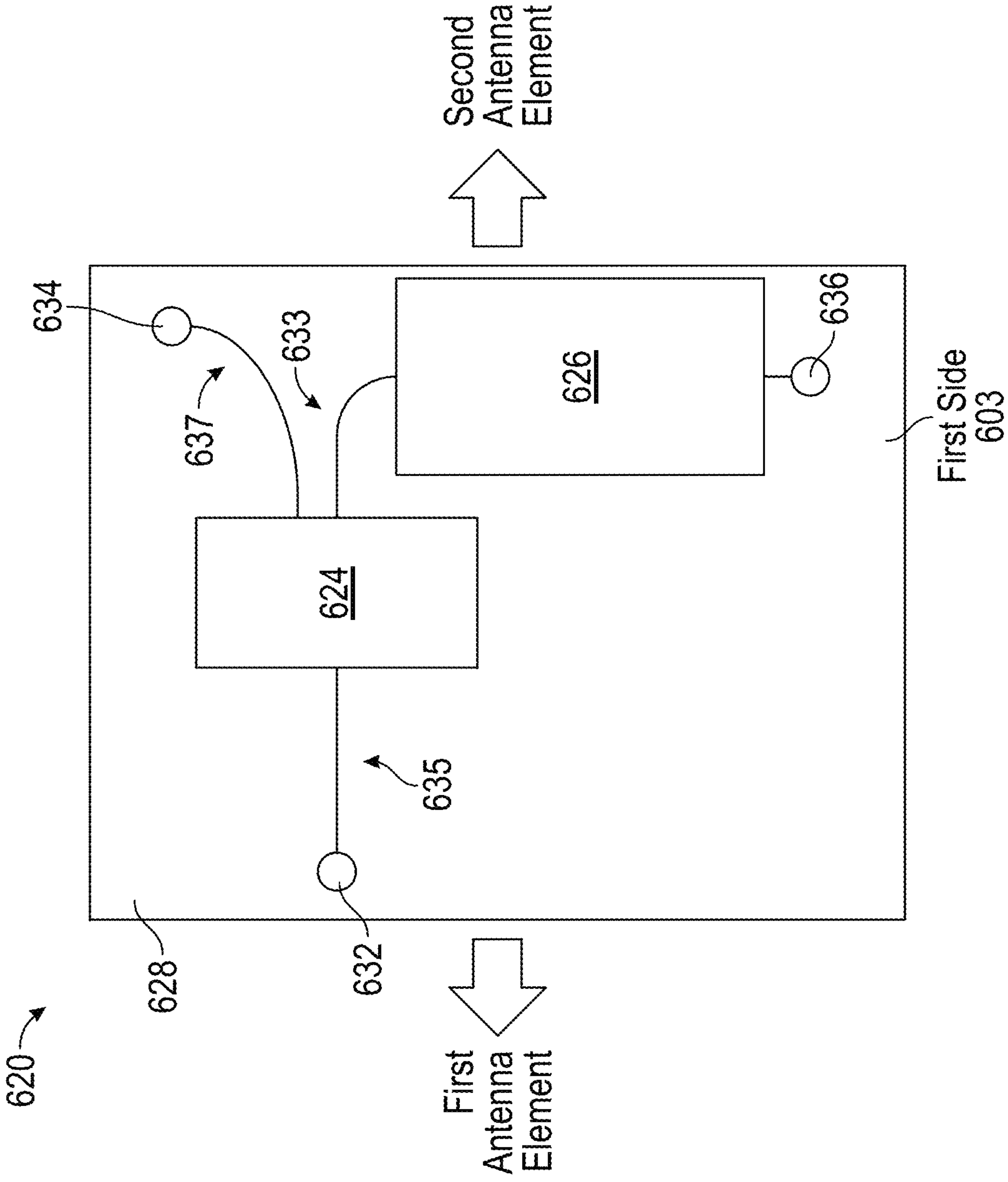
FIG. 6B depicts a block diagram of a top-down view of an example configuration of a SCSIP module in a receiving phased array antenna according to examples of the disclosure.

The SCSIP module 600 shown in FIG. 6A provides only one illustrative example of a SCSIP module configuration. Many variations of the configuration shown in FIG. 6A may be implemented without departing from the scope of the present disclosure. For example, FIG. 6B illustrates a SCSIP module 620 included in a receiving phased array antenna. As illustrated in FIG. 6B, the SCSIP module 620 includes LNA 624 and a post-LNA filter 626 coupled to a first side 603 of a support structure 628. The LNA 624 is electrically coupled to a via 632 by a routing trace 635. The via 632 is electrically coupled to a carrier (e.g., carrier 510) that includes the receiving phased array antenna by a coupling element (e.g., coupling elements 512). The coupling path from the coupling element to the via 632 and to the LNA 624 may be considered a first input of the SCSIP module 620 in the receiving configuration. The first input of the SCSIP module 620 may be coupled to a first antenna element (e.g., antenna modules 402) of the receiving phased array antenna. The LNA 624 is electrically coupled to the post-LNA filter 626 by a routing trace 633. The post-LNA filter 626 is electrically coupled to a via 636, which in turn is coupled to the carrier of the receiving phased array antenna by a coupling element (e.g., coupling elements 512) disposed at a second side (opposite the first side 603) of the support structure 628. The coupling path between the post-LNA filter 626 and the carrier through the via 636 and the coupling element may be considered a first output of the SCSIP module 620 operating in a receiving configuration.

In the receiving configuration, the SCSIP module 620 can receive a receive signal from the first antenna element by the input of the SCSIP module 620, the receive signal can in turn be amplified by the LNA 624 to generate an amplified receive signal. The amplified receive signal output from the LNA 624 may be filtered by the post-LNA filter 626 and routed to the carrier by the first output of the SCSIP module 620. The post-LNA filter 626 may be configured to filter (e.g., attenuate) the amplified receive signal in one or more frequency bands associated with RA. In some embodiments, the SCSIP module 620 may be located in proximity to one or more transmitting phased array antennas in a communication device (not shown). In some embodiments, the communication device can include both the receiving phased array antenna that includes SCSIP module 620 and the one or more receiving phased array antennas. In some embodiments, the post-LNA filter may be configured to filter (e.g., attenuate) frequency components in one or more transmit bands of the one or more transmitting phased array antennas to prevent interference with the one or more transmitting phased array antennas. The transmit bands of the communication device can include, without limitation, L, S, C, X, Ku, K, Ka, V, W, Q, U, E, F, D, millimeter band, or any other frequency band allocated for RF communication. The post-LNA filter 626 can include, without limitation, a high-pass filter, a low-pass filter, a band-reject filter (or notch filter), a band-pass filter, or the like.

The SCSIP module 620 may also optionally be configurable to operate in a calibration transmit configuration. In an embodiment that incorporates a calibration transmit configuration, the SCSIP module 620 may include a via 634 coupled to a coupling element (e.g., coupling elements 512) at the second side (opposite the first side 603) of the support structure 628 which in turn is electrically coupled to the carrier (e.g., carrier 510). The via 634 may be electrically coupled to the LNA 624 by a routing trace 637. The coupling path between the carrier and the LNA 624 through a coupling element may be considered a second output of the SCSIP module 620 in the calibration transmit configuration. The second output of the SCSIP module 620 may be coupled to a second antenna element, different from the first antenna element coupled to the first input of the SCSIP module 620. In the calibration transmit configuration, the LNA 624 can transmit a calibration transmit signal to the second antenna element. For example, the LNA 624 may be coupled to control lines (not shown) that can provide commands to the LNA 624 to change configurations between the receive configuration and the calibration transmit configuration. In the calibration transmit configuration, the post-LNA filter 626 can receive a calibration transmit signal from the carrier by the first output of the SCSIP module 620. The first output of the SCSIP module 620 in the receiving configuration may be considered a second input the SCSIP module 620 in the calibration transmit configuration. The post-LNA filter 626 can filter the calibration transmit signal to generate a filtered calibration transmit signal and output the filtered calibration transmit signal to the LNA 624 by the routing trace 633. The LNA 624 can generate an amplified and filtered calibration transmit signal and output the amplified and filtered calibration transmit signal to the second antenna element by the second output of the SCSIP module 620.

While the SCSIP modules 600 and 620 shown in FIG. 6A and FIG. 6B provide illustrative examples, the configurations may be varied without departing from the scope of the present disclosure. For example, the SCSIP module 600 may couple to the first antenna element in a transmitting configuration and to the second antenna element in the calibration receive element, similar to the configuration shown in FIG. 6B. Similarly, the SCSIP module 620 may couple to the first antenna element (or the second antenna element) in both the receiving configuration and the calibration transmit configuration. In some embodiments, a SCSIP module 620 in a receiving phased array antenna can include a pre-LNA filter between the LNA 624 and the first input without departing from the scope of the present disclosure. Other configuration variations of the illustrated example SCSIP modules 600, 620 can also be implemented without departing from the scope of the present disclosure.

Figure 7A:
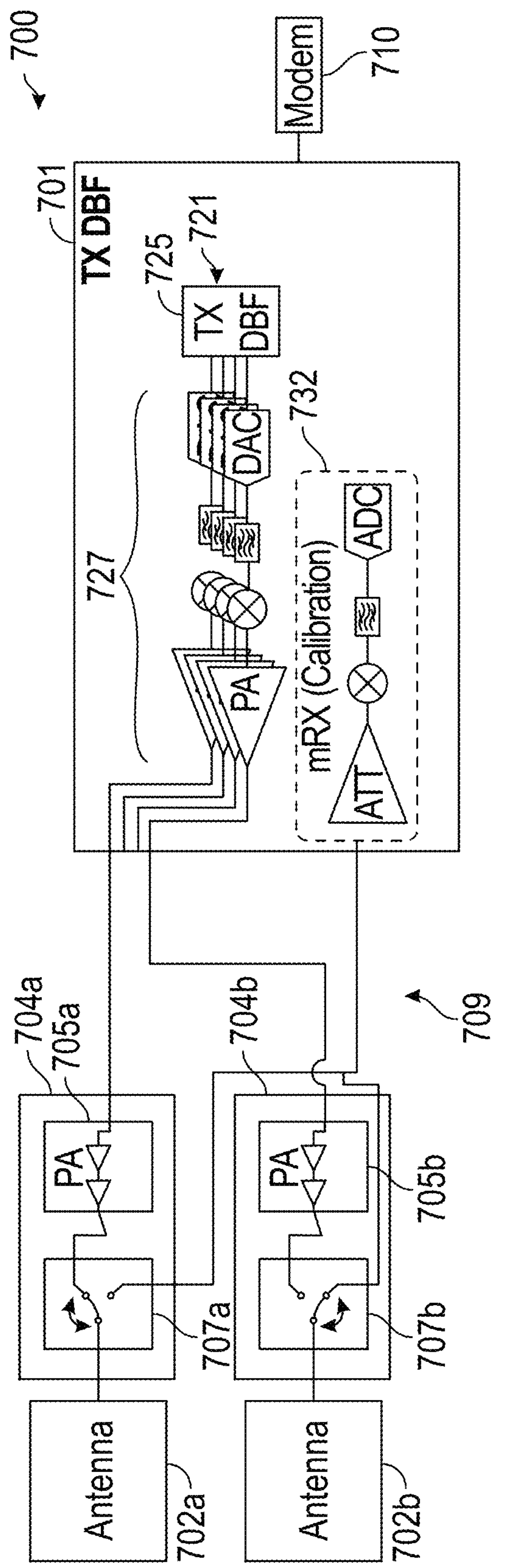
FIG. 7A depicts a simplified example block diagram of a portion of the electronic system of an antenna assembly in a transmitting (Tx) phased array antenna.
Figure 7B:
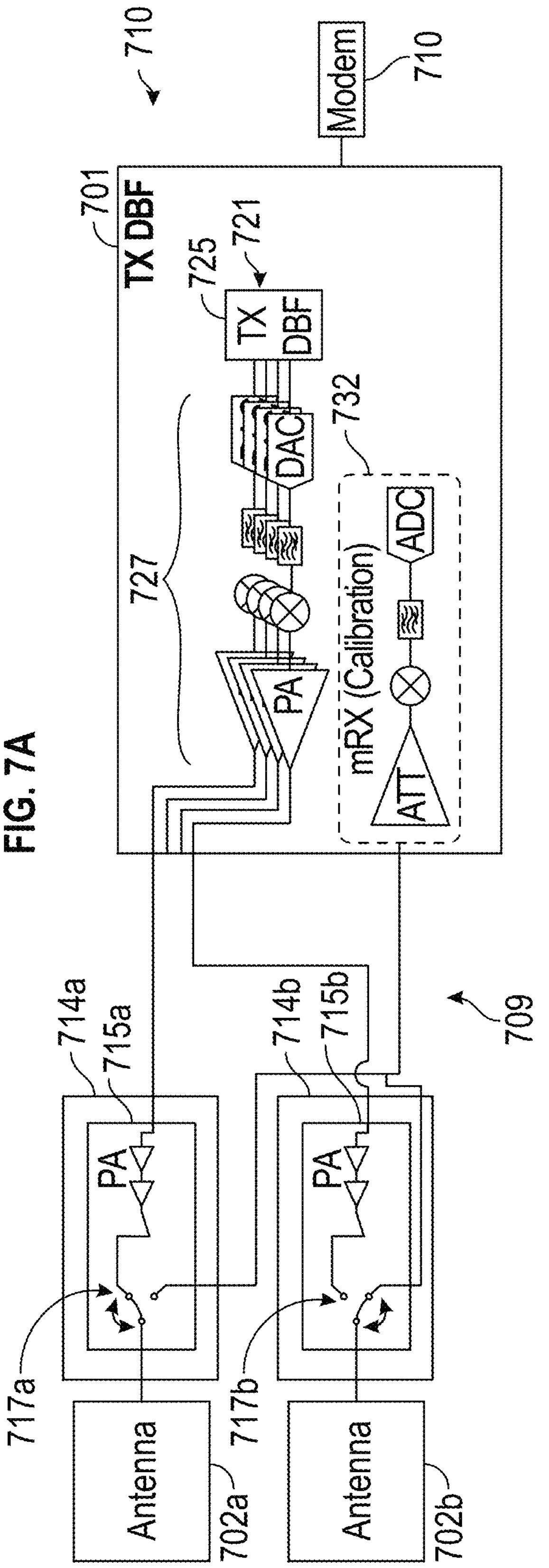
FIG. 7B depicts a variation of the simplified example block diagram of FIG. 7A.

FIG. 7A and FIG. 7B are example simplified schematic illustrations of a portion of the electronic system of a phased array antenna (e.g., phased array antenna 120 of FIG. 1A and FIG. 1B), including an antenna, a SCSIP module, a switch, and a transmit (Tx) digital beamformer (DBF) chip, in accordance with some embodiments of the present disclosure.

FIG. 7A illustrates a simplified schematic illustration of a portion of the electronic system 700 of a transmitting (Tx) phased array antenna including. In some embodiments, the portion of the electronic system 700 shown in FIG. 7A includes a Tx DBF chip 701, which can correspond to, for example, additional components 108 of FIG. 1B. In some embodiments, the portion of the electronic system 700 includes SCSIP modules 704*a* and 704*b*, which can correspond to SCSIP module 500 shown in FIG. 5A, SCSIP module 520 shown in FIG. 5B and FIG. 5C, SCSIP module 600 shown in FIG. 6A, or SCSIP module 620 shown in FIG. 6B. The SCSIP modules 704*a* and 704*b* each includes a switch 707*a*, 707*b*, respectively. The portion of the electronic system 700 shown in FIG. 7A includes antenna elements 702, which can correspond to antenna elements 102 shown in FIG. 1A and FIG. 1B.

Referring to FIG. 7A, switch 707*a* is electrically coupled between antenna element 702*a* and PA 754*a*. Switch 707*b* is electrically coupled between antenna element 702*b* and PA 705*b*. As illustrated, the switches 707*a*, 707*b*, can be included in the SCSIP modules 704*a*, 704*b* as discrete components. In one illustrative example, the switches 707*a*, 707*b*, can be implemented as a pair of MOSFETs configured in a single-pole double-throw switch configuration. Other types of switches can also be used without departing from the scope of the present disclosure. Each switch 707*a*, 707*b* can have a first position and a second position. In the illustrated example of FIG. 7A, switch 707*a* is depicted in the first position, allowing the amplified RF signal outputted by the PA 705*a* in the SCSIP module 704*a* to be the input to antenna element 702*a*. In turn, the antenna element 702*a* radiates the amplified RF signal. Each of the M antenna elements 702 is configured to radiate an amplified RF signal generated by respective Tx RF sections 727 when the switch corresponding to the antenna element is in the first position. The switch 707*b* is depicted in the second position, allowing calibration signals received by the antenna element 702*b* to bypass the PA 705*a*. As illustrated, when the switch 707*b* is in the second position, a calibration signal received by antenna element 702*b* can be routed to the mRx section 732 of Tx DBF chip 701 by calibration coupling path 709. The calibration coupling path 709 can electrically couple to the mRx section 732 of the Tx DBF chip 701 and each of the SCSIP modules 704*a*, 704*b*.

Tx DBF chip 701 includes, among other components, a receive (Rx) section 722 and receive calibration (mRx) section 732. Tx DBF chip 701 is configured to generate RF signals (based on data provided by modem 710) to be transmitted by antenna elements 702 and to calibrate the Rx section 722 using the receive calibration (mRx) section 732 and antenna elements 702. Tx RF sections 727 of the Tx DBF chip 701 are configured to ready time delay and phase encoded digital signals for transmission. The plurality of the Tx RF sections 727 may include M number of Tx RF sections 727, one for each of the M paths for each of the antenna elements 702. In the illustrated example of FIG. 7A, two antenna elements 702*a*, 702*b* are illustrated as examples of antenna elements 702. Each of the Tx RF sections 727 may include other components such as a transmit digital front end (Tx DFE), a digital-to-analog converter (DAC), a low pass filter (LPF), a mixer, and a power amplifier (PA). Accordingly, Tx DBF chip 701 is configured to digitally process a data signal for transmission by a plurality of antenna elements 702.

Receive calibration (mRx) section 732 is selectively electrically coupled to one or more of the antenna elements 702. As noted above, the switch 707*b* in the second position allows a received calibration signal from antenna element 702*b* to be received by the receive calibration section 732. Receive calibration (mRx) section 732 is configured to compensate for phase and/or time delay mismatch produced by Tx DBF chip 701, or other DBF chips in a beamformer lattice that includes Tx DBF chip 701. By selecting between which of the antenna elements 702 is configured to couple with the receive calibration (mRx) section 732, each of the antenna elements 702 can be calibrated.

Referring to FIG. 7A, the Tx section 721 includes a plurality of Tx RF sections 727 and a single receive digital beamformer (Tx DBF) section 725. Each receive Tx RF section 727 includes components such as a power amplifier (PA), a mixer, a low pass filter (LPF), an analog-to-digital converter (ADC), and a receive digital front end (Rx DFE). In the SCSIP modules 704*a*, 704*b*, PAs 705*a*, 705*b* can be configured to perform amplification of the signals output by respective Tx RF sections 728. Accordingly, Tx DBF chip 701 is configured to calibrate the transmit (Tx) section 721 using the receive calibration (mRx) section 732.

FIG. 7B illustrates a variation of the example simplified schematic illustration shown in FIG. 7A. In the example of FIG. 7B, the Tx DBF chip 701 and antenna elements 702 including antenna elements 702*a* and 702*b* can correspond to like numbered components in FIG. 7A. FIG. 7B differs from FIG. 7A in that, within the SCSIP modules 714*a*, 714*b*, the switches 717*a* and 717*b* shown in FIG. 7B are illustrated as being included as part of the PAs 715*a*, 715*b*, respectively. Accordingly, in addition to performing the functionality of PA 705*a*, 705*b* of FIG. 7A, the PAs 715*a*, 715*b* included in SCSIP modules 714*a*, 714*b* can include switching functionality of switches 707*a*, 707*b* of FIG. 7A.

Figure 7C:
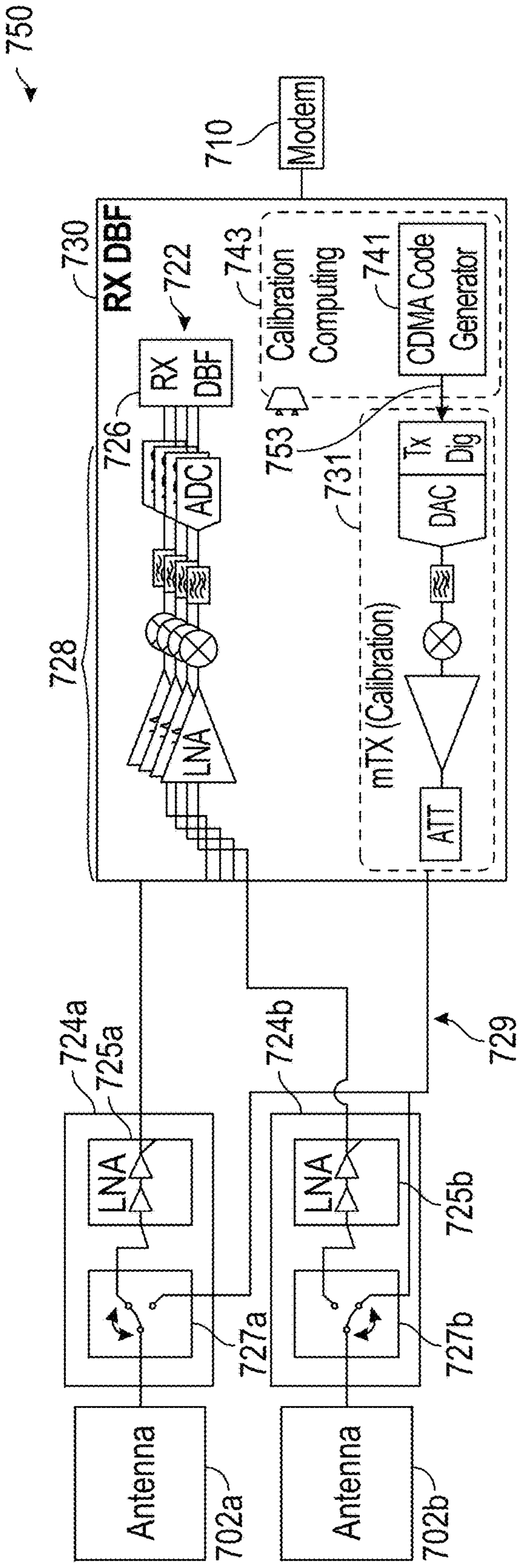
FIG. 7C depicts a simplified example block diagram of a portion of the electronic system of an antenna assembly in a receiving (Rx) phased array antenna.
Figure 7D:
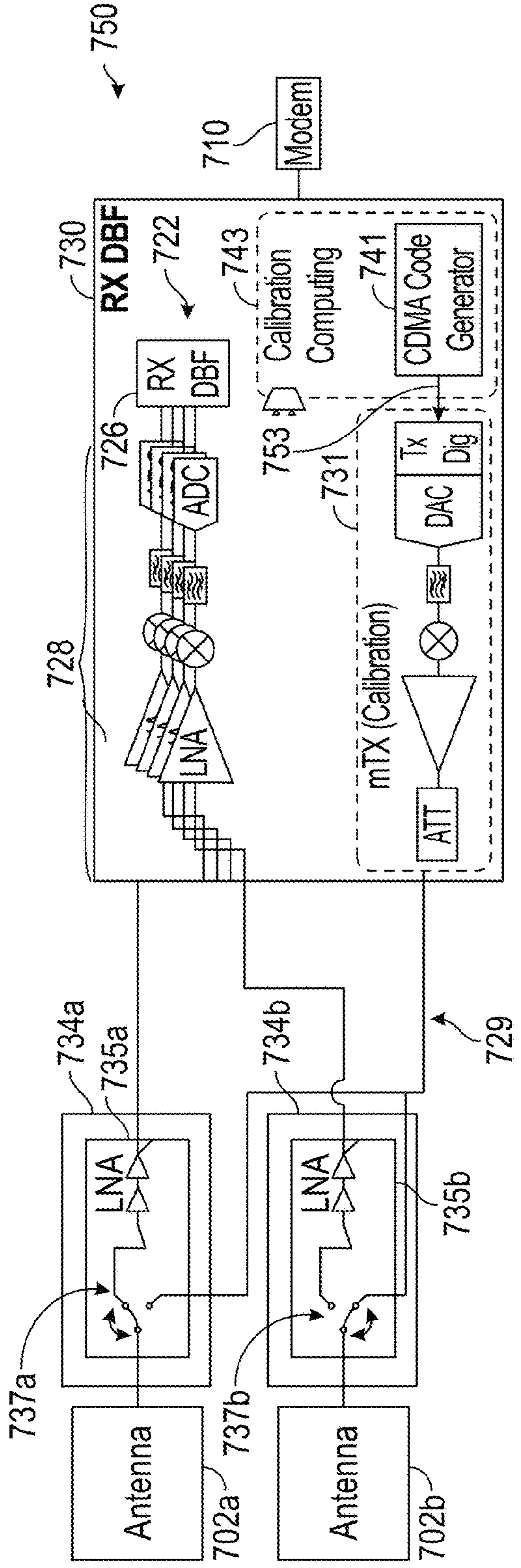
FIG. 7D depicts a variation of the simplified example block diagram of FIG. 7C.

FIG. 7C and FIG. 7D are example simplified schematic illustrations of portions of a portion of an electronic system 750 for a phased array antenna (e.g., phased array antenna 120 of FIG. 1A and FIG. 1B), including an antenna, a SCSIP module, and a receive (Rx) digital beamformer (DBF), in accordance with some embodiments of the present disclosure.

FIG. 7C illustrates a simplified schematic illustration of a portion of the electronic system 750 of a receiving (Rx) phased array antenna. In some embodiments, the portion of the electronic system 750 shown in FIG. 7C includes Rx DBF chip 730, which can correspond to, for example, additional components 108 of FIG. 1B. In some embodiments, the portion of the electronic system 750 includes SCSIP modules, such as SCSIP modules 724A and 724*b*, which can correspond to SCSIP module 500 shown in FIG. 5A, SCSIP module 520 shown in FIG. 5B and FIG. 5C, SCSIP module 600 shown in FIG. 6A, or SCSIP module 620 shown in FIG. 6B. As illustrated, the SCSIP modules 724*a* and 724*b* each include a switch 727*a*, 727*b*, respectively. The portion of the electronic system 750 shown in FIG. 7C includes antenna elements 702, including antenna elements 702*a* and 702*b*, which can correspond to antenna elements 102 shown in FIG. 1A and FIG. 1B.

Referring to FIG. 7C, switch 727*a* is electrically coupled between antenna element 702*a* and LNA 725*a*. Switch 727*b* is electrically coupled between antenna element 702*b* and LNA 725*b*. As illustrated, the switches 727*a*, 727*b*, can be included in the SCSIP modules 724*a*, 724*b* as discrete components. In one illustrative example, the switches 727*a*, 727*b*, can be implemented as a pair of MOSFETs configured in a single-pole double-throw switch configuration. Other types of switches can also be used without departing from the scope of the present disclosure. Each switch 727*a*, 727*b* can have a first position and a second position. In the illustrated example of FIG. 7C, switch 727*a* is depicted in the first position, allowing the RF signal received by antenna element 702*a* to be input into LNA 725*a*. In turn, the LNA is configured to perform low noise amplification of the received RF signals and output the amplified received RF signals to Rx DBF chip 730. Each of the M antenna elements 702 is configured to radiate an amplified RF signal generated by respective Rx RF sections 728 when the switch corresponding to the antenna element is in the first position. The switch 727*b* is depicted in the second position, allowing calibration signals received by the antenna element 702*b* to bypass the LNA 725*a* and allow a calibration transmit (mTx) signal to couple to antenna element 702*a* by calibration coupling path 729 and cause antenna element 702*a* to transmit the calibration signal for the purposes of calibration. The calibration coupling path 729 can electrically couple to the mTx section 731 of the Rx DBF chip 730 and each of the SCSIP modules 724*a*, 724*b*. As illustrated, when the switch 727*b* is in the second position, a Rx RF signal received by antenna element 702*b* can be routed to a corresponding Rx RF section 728.

Rx DBF chip 730 includes, among other components, a Rx section 722 and transmit calibration (mTx) section 731, and a calibration computing section 743 including a calibration code generator 741. Rx DBF chip 730 is configured to receive RF signals received by antenna elements 702 and to calibrate the Rx section 722 using the transmit calibration (mTx) section 731 and antenna elements 702. Rx RF sections 728 of the Rx DBF chip 730 are configured to ready time delay and phase encoded digital signals for transmission. The plurality of the Rx RF sections 728 may include M number of Rx RF sections 728, one for each of the M paths for each of the antenna elements 702. In the illustrated example of FIG. 7C, two antenna elements 702*a*, 702*b* are illustrated as examples of antenna elements 702. Each Rx RF section 728 may include other components such as a transmit digital front end (Tx DFE), a digital-to-analog converter (DAC), a low pass filter (LPF), a mixer, and a low-noise amplifier (LNA). Referring to FIG. 7C, the Rx section 722 includes a plurality of Rx RF sections 728 and a single receive digital beamformer (Rx DBF) section 726. Each of the Rx RF sections 728 includes components such as a low noise amplifier (LNA), a mixer, a low pass filter (LPF), an analog-to-digital converter (ADC), and a receive digital front end (Rx DFE). In the SCSIP modules 724*a*, 724*b*, LNA 724*a*, 724*b* are configured to perform low noise amplification of the RF signal received at the respective antenna element 702*a*, 702*b*. A data signal or stream may be provided to the modem 710 and comprises the output from the Rx section 722.

In the illustrated embodiment, coded calibration signals from the calibration code generator 741 are distributable to the mTx section 731 by line 753. In the illustrated example, the calibration code generator 741 can generate CDMA coded calibration signals. Other encoding for calibration signals can also be used without departing from the scope of the present disclosure.

Transmit calibration (mTx) section 732 is selectively electrically coupled to one or more of the antenna elements 702. As noted above, the switch 707*b* in the second position allows a received calibration signal from antenna element 702*b* to be received by the transmit calibration section 732. Transmit calibration (mTx) section 732 is configured to compensate for phase and/or time delay mismatch produced by Rx DBF chip 730, or other DBF chips in a beamformer lattice that includes Tx DBF chip 701. By selecting between which of the antenna elements 702 is configured to couple with the transmit calibration (mTx) section 732, each of the antenna elements 702 can be calibrated. Accordingly, Rx DBF chip 730 is configured to calibrate the Rx section 722 using the transmit calibration (mTx) section 731.

FIG. 7D illustrates a variation of the example simplified schematic illustration shown in FIG. 7C. In the example of FIG. 7D, the Rx DBF chip 730 and antenna elements 702 including antenna elements 702*a* and 702*b* can correspond to like numbered components in FIG. 7C. FIG. 7D differs from FIG. 7C in that within the SCSIP modules 734*a*, 734*b*, the switches 737*a* and 737*b* shown in FIG. 7D are illustrated as being included as part of the LNAs 735*a*, 735*b*, respectively. Accordingly, in addition to performing the functionality of LNAs 725*a*, 725*b* of FIG. 7C, the LNAs 735*a*, 735*b* can include switching functionality of switches 727*a*, 727*b* of FIG. 7C.

Although the example antenna elements 702 in FIG. 7A through FIG. 7D are illustrated as single port antenna elements, it should be understand that any type of antenna elements, including, without limitation, a dipole antenna, a patch antenna, a slot antenna, a micro-strip antenna, a uni-directional antenna, a dual polarized antenna or the like can be used without departing from the scope of the present disclosure. Similarly, although specific configurations are shown for switches 707*a*, 707*b* in FIG. 7A, 717*a*, 717*b* in FIG. 7B, 727*a*, 727*b* in FIG. 7C, and switches 737*a*, 737*b* in FIG. 7D, other switch configurations can be used without departing from the scope of the present disclosure.

Although Tx DBF chip 701 shown in FIG. 7A and FIG. 7B are configured to transmit and Rx DBF chip 730 in FIG. 7C and FIG. 7D are configured to receive, a DBF chip capable of processing both transmit and receive signals may also be used without departing from the scope of the present disclosure. For example, a transmitting and receiving DBF may include a Tx section, an Rx section, a calibration transmit (mTx) section, and a calibration receive (mRx) section.

Multiple Module Configuration

Figure 8A:
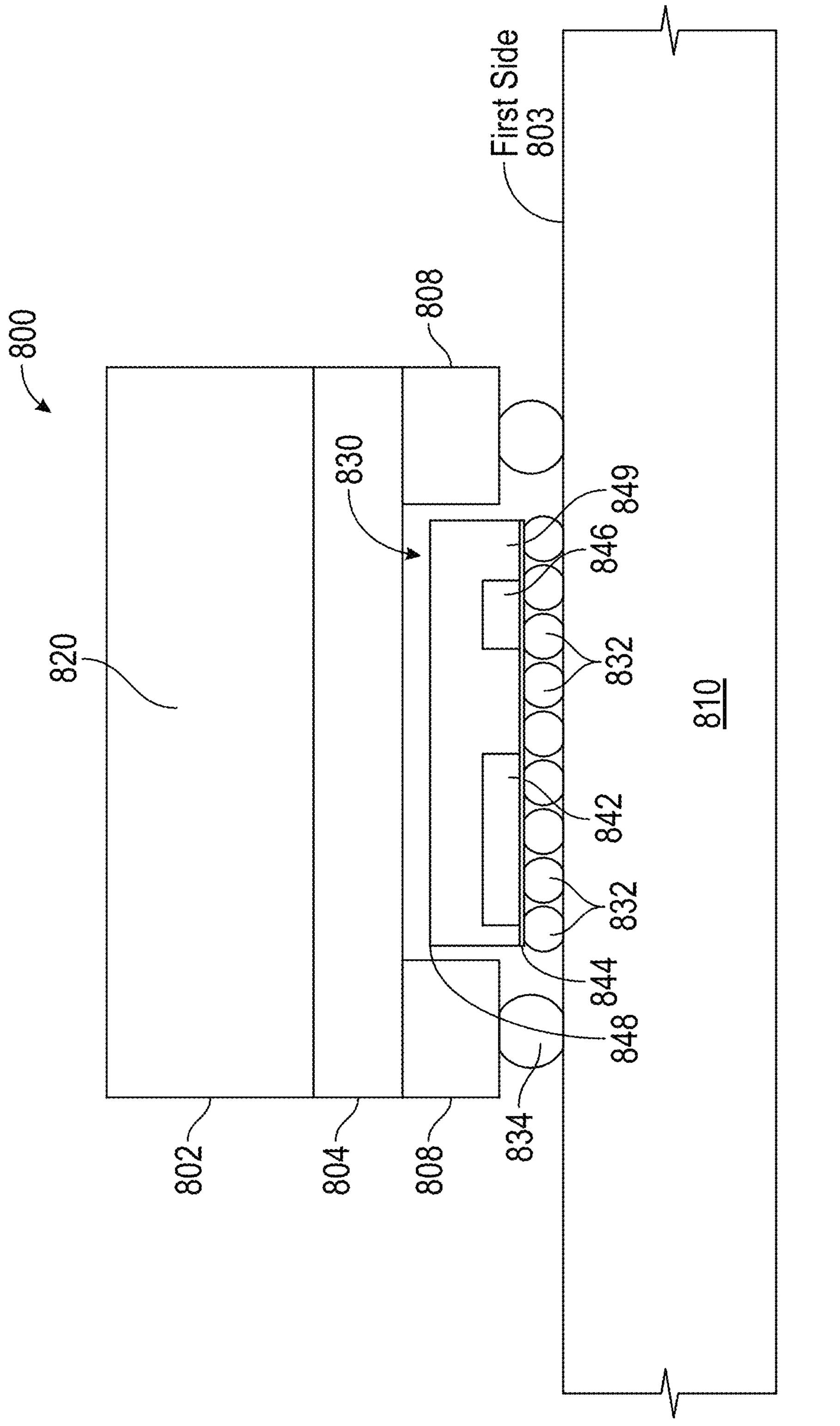
FIG. 8A depicts a block diagram of a cross-sectional side view of an example AIP module according to some embodiments of the present disclosure.

FIG. 8A illustrates and example cross-sectional view of a multiple module configuration 800 including an antenna module 820 and a SCSIP module 830. The antenna module can include antenna element 802, circuitry 804, and spacer structure 808 similar to antenna element 202, circuitry 204, and spacer structure 208 of AIP module 220 shown in FIG. 2B with the amplifier 226 of FIG. 2B replaced by SCSIP module 830. FIG. 8A illustrates the antenna module 820 coupled to a first side 803 of a carrier 810 (e.g., a PCB of a phased array antenna) by coupling elements 834. The coupling elements 834 may include solder balls. As described above with respect to FIG. 2A, although a separate spacer structure 808 and coupling elements 834 are shown, in some cases, the spacer structure 808 and coupling elements 834 can be replaced by coupling elements, such as solder balls, with height sufficient to create the illustrated spacing between the circuitry 804 and carrier 810.

As illustrated, the SCSIP includes a support structure 844 coupled to the first side 803 of the carrier 810 by coupling elements 832. The coupling elements 834 may include solder balls. SCSIP module 830 also includes an amplifier 842, which can correspond to PA 604 of FIG. 6A or LNA 624 of FIG. 6B. SCSIP module 830 also includes an RF filter 846. In some embodiments, RF filter 846 may correspond to pre-PA filter 602, post-PA filter 606 shown in FIG. 6A, post-LNA filter 626 shown FIG. 6B, or any other RF filter. Although the SCSIP module 830 includes a single RF filter 846, a SCSIP module 830 that includes multiple RF filters as well as other signal conditioning elements not illustrated in FIG. 8A can be used without departing from the scope of the present disclosure.

In some cases, the RF filter 846 can be configured to filter one or more frequency bands associated with radio astronomy to prevent unwanted RA band interference. In some cases, the RF filter 846 may be configured to filter one or more frequency bands associated with other antennas (e.g., phased array antennas) operating in proximity to the phased array antenna incorporating multiple module configuration 800. For example, if multiple module configuration 800 is included in a transmitting phased array antenna (not shown) operating in proximity to one or more receiving phased array antenna (not shown) in a communication device (not shown), the RF filter 846 configured as a post-PA filter may be configured to filter out components of a signal amplified by amplifier 842 configured as a PA in the operating frequency band of the receiving phased array antenna to prevent interfering with the receiving phased array antenna. Similarly, if the multiple module configuration is included in receiving phased array antenna (not shown) operating in physical proximity to one or more transmitting phased array antennas in a communication device (not shown), the RF filter 846 configured as a pre-LNA filter may be configured to filter out components of a signal amplifier by amplifier 842 configured as an LNA in the operating frequency band of the transmitting phased array antenna to prevent saturating the LNA input with the signals from the transmitting phased array antenna. The RF filter 846 can include, without limitation, a high-pass filter, a low-pass filter, a band-reject filter (or notch filter), a band-pass filter, or the like.

SCSIP module 830 can also include a shield 848 that can correspond to and perform similar functions to shield 508 shown in FIG. 5A. SCSIP module 830 can also include an isolation material 849 that can correspond to and perform similar functions to isolation material 506 shown in FIG. 5A. For example, the shield 848 and isolation material 849 in combination can form a continuous enclosure around the amplifier 842 and RF filter 846. In some cases, the shield 848 may be disposed on the isolation material 849 with one or more gaps. In such cases, the isolation material 849 and the shield 848 in combination can ensure a consistent environment for amplifier 842 and the RF filter 846 of the SCSIP module 830.

As described above with respect to FIG. 5A, the support structure 844 can include a grounded conductor (e.g., a ground layer or ground plane) disposed between the amplifier 842 and RF filter 846 and the carrier 810. In some cases, the grounded conductor can electrically isolate the amplifier 842 and RF filter 846 from the carrier 810 (e.g., from electrical conductors or other materials disposed on the carrier 810). By electrically isolating the amplifier 842 and RF filter 846 from the carrier 810 by using the support structure 844, the performance of the amplifier 842 and RF filter 846 can be unaffected by variations in the spacing between the SCSIP module 830 and the carrier 810, for example, due to variations in the heights of solder balls (e.g., coupling elements 832) as described with respect to FIG. 2C and FIG. 2D above. In another embodiment, when the shield 848 is grounded and the support structure 844 also includes a ground plane, the amplifier 842 and RF filter 846 may be shielded from leakage and/or coupling with antenna elements of the antenna lattice including the multiple module configuration 800 (e.g., antenna lattice 400 as shown in FIG. 4A and FIG. 4B) on all sides.

Figure 8B:
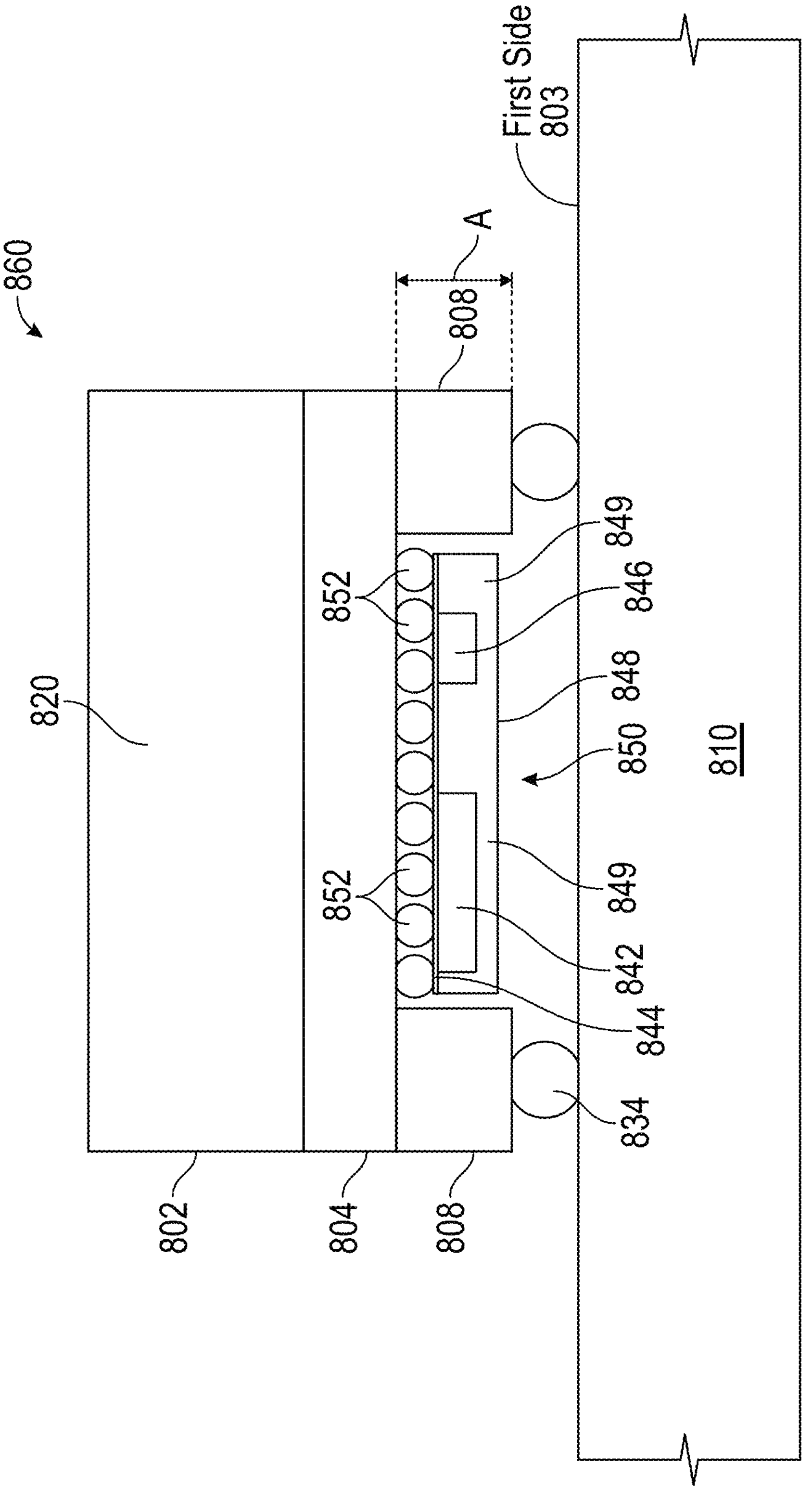
FIG. 8B depicts a block diagram of a cross-sectional side view of an example AIP module according to some embodiments of the present disclosure.

FIG. 8B illustrates another multiple module configuration 860 similar to the multiple module configuration 800 shown in FIG. 8A except that the SCSIP module 850 shown in FIG. 8B can be coupled by coupling elements 852 to the circuitry 804 of the antenna module 820, in contrast to the SCSIP module 830 being coupled to the carrier 810 by coupling elements 832. The SCSIP module 850 can include amplifier 842, support structure 844, RF filter 846, shield 848, and isolation material 849, each of which can be similar to and perform similar functions to corresponding numbered features shown in FIG. 8A. Similarly, the antenna module 820 can include antenna element 802, circuitry 804, spacer structure 808, and coupling elements 834, which can be similar to and perform similar functions to corresponding numbered features shown in FIG. 8A.

Illustrative examples of the apparatuses, systems, and methods of various embodiments disclosed herein are provided below. An embodiment of the apparatus, system, or method may include any one or more, and any combination of, the examples described below.

Example 1 is a phased array antenna system including a carrier having a first side and a second side opposite the first side; a first antenna element and a second antenna element coupled to the first side of the carrier, the second antenna element spaced apart from the first antenna element by a space; and a signal conditioning module including a support structure having a first side and a second side opposite the first side, one or more signal conditioning elements coupled to the first side of the support structure, and a plurality of coupling elements coupled to the second side of the support structure, wherein: at least one of the plurality of coupling elements electrically couples the signal conditioning module to the first antenna element; and at least another of the plurality of coupling elements electrically couples the signal conditioning module to the carrier.

Example 2 includes the phased array antenna system of Example 1, wherein the support structure includes a ground plane.

Example 3 includes the phased array antenna system of any of Examples 1 to 2, wherein the ground plane is disposed between the one or more signal conditioning elements and the plurality of coupling elements.

Example 4 includes the phased array antenna system of any of Examples 1 to 3, wherein the plurality of coupling elements includes a plurality of solder balls and the ground plane provides at least partial electromagnetic isolation between the one or more signal conditioning elements and the carrier.

Example 5 includes the phased array antenna system of any of Examples 1 to 4, wherein the one or more signal conditioning elements include first and second filter elements coupled to the support structure.

Example 6 includes the phased array antenna system of any of Examples 1 to 5, wherein the first and second filter elements are configured to attenuate signals within one or more radio astronomy (RA) frequency bands.

Example 7 includes the phased array antenna system of any of Examples 1 to 6, wherein the one or more signal conditioning elements are at least partially covered by one or more layers of an isolation material.

Example 8 includes the phased array antenna system of any of Examples 1 to 7, wherein a shielding layer is disposed on at least a portion of the isolation material.

Example 9 includes the phased array antenna system of any of Examples 1 to 8, wherein the shielding layer is conductive and electrically coupled to a ground conductor of the signal conditioning module included in the support structure.

Example 10 includes the phased array antenna system of any of Examples 1 to 9 wherein the shielding layer and the support structure form a continuous enclosure around the one or more signal conditioning elements.

Example 11 includes the phased array antenna system of any of Examples 1 to 10, wherein the shielding layer includes a faraday cage.

Example 12 includes the phased array antenna system of any of Examples 1 to 11, wherein the shielding layer includes a floating metallic layer disposed on one or more surfaces of the isolation material.

Example 13 includes the phased array antenna system of any of Examples 1 to 12, wherein a first antenna module coupled to the first side of the carrier includes the first antenna element and a second antenna module coupled to the first side of the carrier includes the second antenna element.

Example 14 includes the phased array antenna system of any of Examples 1 to 13, wherein the one or more signal conditioning elements comprise an amplifier.

Example 15 includes the phased array antenna system of any of Examples 1 to 14, wherein the amplifier is electrically coupled to the first antenna element.

Example 16 includes the phased array antenna system of any of Examples 1 to 15, wherein: the amplifier includes a power amplifier (PA) configured to operate in at least a transmit configuration; and the amplifier is configured to transmit a transmit signal to the first antenna element in the transmit configuration.

Example 17 includes the phased array antenna system of any of Examples 1 to 16, wherein the amplifier is further configured to operate in a calibration receive configuration and receive a calibration signal from at least one of the first antenna element, the second antenna element, and another antenna element of the phased array antenna system.

Example 18 includes the phased array antenna system of any of Examples 1 to 17, wherein configuring the PA in the transmit configuration comprises configuring a selection switch in a first position, wherein the selection switch is disposed between the first antenna element and the PA.

Example 19 includes the phased array antenna system of any of Examples 1 to 18, wherein configuring the PA in the calibration receive configuration comprises configuring the selection switch in a second position.

Example 20 includes the phased array antenna system of any of Examples 1 to 19, wherein a pre-amplifier filter is electrically coupled between an input of the signal conditioning module and an input of the PA.

Example 21 includes the phased array antenna system of any of Examples 1 to 20, wherein the pre-amplifier filter is configured to attenuate signals in one or more RA frequency bands.

Example 22 includes the phased array antenna system of any of Examples 1 to 21, wherein a post-amplifier filter is electrically coupled between an output of the PA and an output of the signal conditioning module.

Example 23 includes the phased array antenna system of any of Examples 1 to 22, wherein the post-amplifier filter is configured to attenuate signals in one or more RA frequency bands.

Example 24 includes the phased array antenna system of any of Examples 1 to 23, wherein: the amplifier includes a low-noise amplifier (LNA) configured to operate in a receive configuration; and the LNA is configured to receive a receive signal from the first antenna element in the receive configuration.

Example 25 includes the phased array antenna system of any of Examples 1 to 24, wherein the LNA is further configured to operate in a calibration transmit configuration and transmit signals to at least one of the first antenna element, the second antenna element, or another antenna element of the phased array antenna system.

Example 26 includes the phased array antenna system of any of Examples 1 to 25, wherein configuring the PA in the transmit configuration comprises configuring a selection switch in a first position, wherein the selection switch is disposed between the first antenna element and the PA.

Example 27 includes the phased array antenna system of any of Examples 1 to 26, wherein configuring the PA in the calibration receive configuration comprises configuring the selection switch in a second position.

Example 28 includes the phased array antenna system of any of Examples 1 to 27, wherein the signal conditioning module is coupled to the carrier and disposed in the space on the first side of the carrier between the first antenna element and the second antenna element and the support structure is spaced from the carrier by the plurality of coupling elements.

Example 29 includes the phased array antenna system of any of Examples 1 to 28, wherein the first antenna element is included in an antenna module, the signal conditioning module is disposed within a cavity of the antenna module between the antenna module and the carrier, and the support structure is spaced from the first antenna element by the plurality of coupling elements.

Example 30 includes the phased array antenna system of any of Examples 1 to 29, wherein the first antenna element is included in an antenna module, the signal conditioning module is disposed within a cavity of the antenna module between the antenna module and the carrier, and the support structure is spaced from the carrier by the plurality of coupling elements.

Example 31 is a signal conditioning system including a support structure having a first side and a second side opposite the first side; one or more signal conditioning elements coupled to the first side of the support structure; and a plurality of coupling elements coupled to the second side of the support structure.

Example 32 includes the signal conditioning system of Example 31, wherein the support structure includes a ground layer disposed at least partially between the one or more signal conditioning elements and the plurality of coupling elements.

Example 33 includes the signal conditioning system of any of Examples 31 to 32, wherein the one or more signal conditioning elements includes an amplifier.

Example 34 includes the signal conditioning system of any of Examples 31 to 33, wherein the one or more signal conditioning elements includes one or more RF filters.

Example 35 includes the signal conditioning system of any of Examples 31 to 34, wherein the support structure includes a ground plane.

Example 36 includes the signal conditioning system of any of Examples 31 to 31, wherein the ground plane is at least partially disposed between the one or more signal conditioning elements and the plurality of coupling elements.

Example 37 includes the signal conditioning system of any of Examples 31 to 35, wherein the plurality of coupling elements includes one or more solder balls and the ground plane provides at least partial electromagnetic isolation between the one or more signal conditioning elements and a component of a phased array antenna coupled to the plurality of coupling elements.

Example 38 includes the signal conditioning system of any of Examples 31 to 36, wherein the component of the phased array antenna coupled to the plurality of coupling elements includes a carrier of the phased array antenna.

Example 39 includes the signal conditioning system of any of Examples 31 to 37, wherein the component of the phased array antenna coupled to the plurality of coupling elements includes an antenna module of the phased array antenna.

Example 40 includes the signal conditioning system of any of Examples 31 to 38, wherein the signal conditioning system is disposed in a cavity between the antenna module and a carrier of the phased array antenna.

Example 41 includes the signal conditioning system of any of Examples 31 to 39, wherein the one or more signal conditioning elements include first and second filter elements coupled to the support structure.

Example 42 includes the signal conditioning system of any of Examples 31 to 40, wherein the first and second filter elements are configured to attenuate signals within one or more radio astronomy (RA) frequency bands.

Example 43 includes the signal conditioning system of any of Examples 31 to 41, wherein the one or more signal conditioning elements are at least partially covered by one or more layers of an isolation material.

Example 44 includes the signal conditioning system of any of Examples 31 to 43, wherein a shielding layer is disposed on at least a portion of the isolation material.

Example 45 includes the signal conditioning system of any of Examples 31 to 44, wherein the shielding layer is conductive and electrically coupled to a ground conductor of the signal conditioning system included in the support structure.

Example 46 includes the signal conditioning system of any of Examples 31 to 45, wherein the shielding layer and the support structure form a continuous enclosure around the one or more signal conditioning elements.

Example 47 includes the signal conditioning system of any of Examples 31 to 46, wherein the shielding layer includes a faraday cage.

Example 48 includes the signal conditioning system of any of Examples 31 to 47, wherein the shielding layer includes a floating metallic layer disposed on one or more surfaces of the isolation material.

Example 49 is a phased array antenna system including a carrier having a first side and a second side opposite the first side; a first antenna element and a second antenna element coupled to the first side of the carrier, the second antenna element spaced apart from the first antenna element by a space; and a signal conditioning module including a support structure having a first side and a second side opposite the first side, one or more signal conditioning elements coupled to the first side of the support structure, and a plurality of coupling elements coupled to the second side of the support structure, wherein: the signal conditioning module is coupled to the first side of the carrier and disposed in the space on the first side of the carrier between the first antenna element and the second antenna element; at least one of the plurality of coupling elements is electrically coupled to the carrier; the signal conditioning module is electrically coupled to the first antenna element via the carrier; and the support structure is spaced from the carrier by the plurality of coupling elements.

Example 50 includes the phased array antenna system of Example 49, wherein the support structure includes a ground plane.

Example 51 includes the phased array antenna system of any of Examples 49 to 50, wherein the ground plane is disposed between the one or more signal conditioning elements and the plurality of coupling elements.

Example 52 includes the phased array antenna system of any of Examples 49 to 51, wherein the plurality of coupling elements includes a plurality of solder balls and the ground plane provides at least partial electromagnetic isolation between the one or more signal conditioning elements and the carrier.

Example 53 includes the phased array antenna system of any of Examples 49 to 52, wherein the one or more signal conditioning elements include first and second filter elements coupled to the support structure.

Example 54 includes the phased array antenna system of any of Examples 49 to 53, wherein the first and second filter elements are configured to attenuate signals within one or more radio astronomy (RA) frequency bands.

Example 55 includes the phased array antenna system of any of Examples 49 to 54, wherein the one or more signal conditioning elements are at least partially covered by one or more layers of an isolation material.

Example 56 includes the phased array antenna system of any of Examples 49 to 55, wherein a shielding layer is disposed on at least a portion of the isolation material.

Example 57 includes the phased array antenna system of any of Examples 49 to 56, wherein the shielding layer is conductive and electrically coupled to a ground conductor of the signal conditioning module included in the support structure.

Example 58 includes the phased array antenna system of any of Examples 49 to 57 wherein the shielding layer and the support structure form a continuous enclosure around the one or more signal conditioning elements.

Example 59 includes the phased array antenna system of any of Examples 49 to 58, wherein the one or more signal conditioning elements comprise an amplifier.

Example 60 includes the phased array antenna system of any of Examples 49 to 59, wherein a first antenna module coupled to the first side of the carrier includes the first antenna element and a second antenna module coupled to the first side of the carrier includes the second antenna element.

Example 61 includes the phased array antenna system of any of Examples 49 to 60, wherein the amplifier is electrically coupled to the first antenna element.

Example 62 includes the phased array antenna system of any of Examples 49 to 61, wherein: the amplifier includes a power amplifier (PA) configured to operate in at least a transmit configuration; and the amplifier is configured to transmit a transmit signal to the first antenna element in the transmit configuration.

Example 63 includes the phased array antenna system of any of Examples 49 to 62, wherein the amplifier is further configured to operate in a calibration receive configuration and receive a calibration signal from at least one of the first antenna element, the second antenna element, and another antenna element of the phased array antenna system.

Example 64 includes the phased array antenna system of any of Examples 49 to 63, wherein a pre-amplifier filter is electrically coupled between an input of the signal conditioning module and an input of the PA.

Example 65 includes the phased array antenna system of any of Examples 49 to 64, wherein the pre-amplifier filter is configured to attenuate signals in one or more RA frequency bands.

Example 66 includes the phased array antenna system of any of Examples 49 to 65, wherein a post-amplifier filter is electrically coupled between an output of the PA and an output of the signal conditioning module.

Example 67 includes the phased array antenna system of any of Examples 49 to 66, wherein the post-amplifier filter is configured to attenuate signals in one or more RA frequency bands.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A phased array antenna system comprising:
a carrier;
a first antenna element and a second antenna element coupled to a first side of the carrier, the second antenna element spaced apart from the first antenna element by a space; and
a signal conditioning module including a support structure having a first side and a second side opposite the first side, one or more signal conditioning elements coupled to the first side of the support structure, and a plurality of coupling elements coupled to the second side of the support structure, wherein:
the signal conditioning module is coupled to the first side of the carrier and disposed in the space on the first side of the carrier between the first antenna element and the second antenna element;
at least one of the plurality of coupling elements is electrically coupled to the carrier;
the signal conditioning module is electrically coupled to the first antenna element via the carrier; and
the support structure is spaced from the carrier by the plurality of coupling elements.

2. The phased array antenna system of claim 1, wherein the support structure comprises a ground plane.

3. The phased array antenna system of claim 2, wherein the ground plane is disposed between the one or more signal conditioning elements and the plurality of coupling elements.

4. The phased array antenna system of claim 3, wherein the plurality of coupling elements comprises a plurality of solder balls and the ground plane provides at least partial electromagnetic isolation between the one or more signal conditioning elements and the carrier.

5. The phased array antenna system of claim 1, wherein the one or more signal conditioning elements are at least partially covered by one or more layers of an isolation material.

6. The phased array antenna system of claim 5, wherein a shielding layer is disposed on at least a portion of the isolation material.

7. The phased array antenna system of claim 6, wherein the shielding layer is conductive and electrically coupled to a ground conductor of the signal conditioning module included in the support structure.

8. The phased array antenna system of claim 6 wherein the shielding layer and the support structure form a continuous enclosure around the one or more signal conditioning elements.

9. The phased array antenna system of claim 1, wherein the one or more signal conditioning elements comprises an amplifier.

10. The phased array antenna system of claim 9, wherein a first antenna module coupled to the first side of the carrier includes the first antenna element and a second antenna module coupled to the first side of the carrier includes the second antenna element.

11. The phased array antenna system of claim 10, wherein the amplifier is electrically coupled to the first antenna element.

12. The phased array antenna system of claim 11, wherein:

the amplifier comprises a power amplifier (PA) configured to operate in at least a transmit configuration; and the amplifier is configured to transmit a transmit signal to the first antenna element in the transmit configuration.

13. The phased array antenna system of claim 12, wherein the amplifier is further configured to operate in a calibration receive configuration and receive a calibration signal from at least one of the first antenna element, the second antenna element, or another antenna element of the phased array antenna system.

14. The phased array antenna system of claim 12, wherein a pre-amplifier filter is electrically coupled between a transmit signal source and an input of the PA.

15. The phased array antenna system of claim 14, wherein the pre-amplifier filter is configured to attenuate signals in one or more RA frequency bands.

16. The phased array antenna system of claim 12, wherein a post-amplifier filter is electrically coupled between an output of the PA and the first antenna element.

17. The phased array antenna system of claim 16, wherein the post-amplifier filter is configured to attenuate signals in one or more RA frequency bands.

18. The phased array antenna system of claim 9, wherein:

the amplifier comprises a low-noise amplifier (LNA) configured to operate in at least a receive configuration; and the amplifier is configured to receive a signal from the first antenna element in the receive configuration.

19. The phased array antenna system of claim 18, wherein the LNA is further configured to operate in a calibration transmit configuration and transmit signals to at least one of the first antenna element, the second antenna element, or another antenna element of the phased array antenna system.

20. The phased array antenna system of claim 19, wherein configuring the LNA in the receive configuration comprises configuring a selection switch in a first position, wherein the selection switch is disposed between the first antenna element and the LNA.

21. The phased array antenna system of claim 20, wherein configuring the LNA in the calibration transmit configuration comprises configuring the selection switch in a second position.

* * * * *